(12) United States Patent
Zhang

(10) Patent No.: US 11,503,377 B2
(45) Date of Patent: Nov. 15, 2022

(54) METHOD AND ELECTRONIC DEVICE FOR PROCESSING DATA

(71) Applicant: BEIJING DAJIA INTERNET INFORMATION TECHNOLOGY CO., LTD., Beijing (CN)

(72) Inventor: Yang Zhang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 9 days.

(21) Appl. No.: 17/038,970

(22) Filed: Sep. 30, 2020

(65) Prior Publication Data

US 2021/0099761 A1    Apr. 1, 2021

(30) Foreign Application Priority Data

Sep. 30, 2019  (CN) .......................... 201910947226.5

(51) Int. Cl.
| | |
|---|---|
| *H04N 21/4788* | (2011.01) |
| *G06T 7/70* | (2017.01) |
| *G10L 15/22* | (2006.01) |
| *H04N 21/2187* | (2011.01) |
| *H04N 21/431* | (2011.01) |

(Continued)

(52) U.S. Cl.
CPC .......... *H04N 21/4788* (2013.01); *G06T 7/70* (2017.01); *G06V 40/10* (2022.01); *G06V 40/168* (2022.01); *G10L 15/22* (2013.01); *H04N 21/2187* (2013.01); *H04N 21/4312* (2013.01);

(Continued)

(58) Field of Classification Search
CPC .......... H04N 21/4788; H04N 21/2187; H04N 21/4312; H04N 21/44218; H04N 21/233; H04N 21/23418; H04N 21/8146; H04N 21/234345; H04N 21/25866; H04N 21/4532; G06K 9/00268; G06K 9/00362; G06K 9/00671; G06T 7/70;

(Continued)

(56) References Cited

U.S. PATENT DOCUMENTS

| | | | |
|---|---|---|---|
| 2010/0306402 A1 | 12/2010 | Russell et al. | |
| 2010/0306655 A1* | 12/2010 | Mattingly | G06F 3/0482 715/720 |

(Continued)

FOREIGN PATENT DOCUMENTS

| | | |
|---|---|---|
| CN | 106878820 A | 6/2017 |
| CN | 109922354 A | 6/2019 |

(Continued)

OTHER PUBLICATIONS

First Office Action of Chinese Patent Application No. 201910947226.5—28 pages (dated Feb. 18, 2021).

*Primary Examiner* — John R Schnurr
(74) *Attorney, Agent, or Firm* — Knobbe Martens Olson & Bear LLP

(57) ABSTRACT

The present disclosure relates to a method and electronic device for processing data. The electronic device can execute the method that can include: acquiring an interactive message, the interactive message being transmitted based on live streaming data; extracting first feature data from the interactive message; determining first pose data based on the first feature data; and determining a pose of a first virtual avatar based on the first pose data, and transmitting the first virtual avatar.

20 Claims, 13 Drawing Sheets

Extracting first feature data from real-time chat data when the real-time chat data transmitted by a first terminal or a second terminal or both is acquired — S201

Determining first pose data corresponding to the first feature data based on a pre-established corresponding relationship between feature data and pose data of a first virtual avatar — S202

Changing a pose of the first virtual avatar based on the first pose data, and transmitting the first virtual avatar with the pose changed based on the first pose data to the first terminal — S203

(51) Int. Cl.
*H04N 21/442* (2011.01)
*G06V 40/10* (2022.01)
*G06V 40/16* (2022.01)

(52) U.S. Cl.
CPC ............. *H04N 21/44218* (2013.01); *G06T 2207/30201* (2013.01); *G10L 2015/223* (2013.01)

(58) Field of Classification Search
CPC .......... G06T 2207/30201; G10L 15/22; G10L 2015/223; G06F 3/011; G06F 3/012
See application file for complete search history.

(56) References Cited

U.S. PATENT DOCUMENTS

| | | | |
|---|---|---|---|
| 2011/0246908 A1* | 10/2011 | Akram | H04N 21/27 715/752 |
| 2011/0296324 A1* | 12/2011 | Goossens | G06Q 50/01 715/763 |
| 2014/0267313 A1* | 9/2014 | Marsella | G06T 13/00 345/474 |
| 2015/0350125 A1* | 12/2015 | Henderson | H04L 51/04 715/753 |
| 2016/0134938 A1* | 5/2016 | Miyazaki | H04N 21/4788 348/14.07 |
| 2019/0306540 A1* | 10/2019 | Holmberg | H04N 21/4394 |
| 2020/0077157 A1* | 3/2020 | Kurabuchi | H04N 21/816 |
| 2021/0312161 A1* | 10/2021 | Wu | G06V 40/164 |

FOREIGN PATENT DOCUMENTS

| | | |
|---|---|---|
| CN | 109936774 A | 6/2019 |
| CN | 110035325 A | 7/2019 |
| CN | 110119700 A | 8/2019 |
| WO | 2016/154149 A1 | 9/2016 |

* cited by examiner

METHOD AND ELECTRONIC DEVICE FOR PROCESSING DATA

CROSS-REFERENCE TO RELATED APPLICATIONS

This application claims priority under 35 U.S.C. 119 to Chinese Patent application No. 201910947226.5, filed on Sep. 30, 2019, in the China National Intellectual Property Administration, the disclosure of which is herein incorporated by reference in its entirety.

TECHNICAL FIELD

The present disclosure relates to the field of Internet live streaming technologies and, particularly, relates to a method and electronic device for processing data.

BACKGROUND

With the development of communication technologies, the network bandwidth capacity and network speed are getting higher and higher, which has given birth to a large number of video live streaming applications. By a video live streaming application, an anchor using a smart terminal can send a live video to a plurality of viewers using smart terminals in real time, and the anchor can also use the smart terminal to interact with the audience such as voice chat interaction and text chat interaction between the anchor and the audience. Since the anchor and the audience can only use voice chat and text chat, such interactions are monotonous and easily lead to the loss of the audience.

SUMMARY

The present disclosure provides a method for processing data, and an electronic device, and a storage medium thereof. The technical solutions of the present disclosure are as follows.

In one aspect, a method for processing data is provided. The method includes:

acquiring an interactive message, wherein the interactive message is transmitted based on live streaming data;

extracting first feature data from the interactive message;

determining first pose data based on the first feature data; and determining a pose of a first virtual avatar based on the first pose data, and transmitting the first virtual avatar.

In another aspect, a method for processing data is provided. The method includes:

displaying a live streaming image based on live streaming data, wherein the live streaming image includes a first virtual avatar;

receiving first pose data of the first virtual avatar, wherein the first pose data is triggered by an interactive message; and displaying the first virtual avatar in the live streaming image based on the first pose data.

In another aspect, an electronic device is provided. The electronic device includes: a processor, and a memory for storing at least one instruction executable by the processor, wherein the at least one instruction, when executed by the processor, enables the processor to perform the method for processing data as described in the above aspect.

In another aspect, a storage medium storing at least one instruction therein is provided. The at least one instruction, when executed by a processor of an electronic device, enables the electronic device to perform the method for processing data as described in the above aspect.

In another aspect, a computer program product is provided. The computer program product, when running on a computer, enables the computer to perform the method for processing data as described in the above aspect.

BRIEF DESCRIPTION OF THE DRAWINGS

The accompanying drawings herein are incorporated into and constitute a part of the specification, illustrating embodiments consistent with the present disclosure and explaining the principles of the present disclosure together with the specification. They are not intended to improperly limit the present disclosure.

DETAILED DESCRIPTION

The technical solutions in the embodiments of the present disclosure are clearly and completely described below with reference to the accompanying drawings, in order to allow those of ordinary skills in the art to have a better understanding of the technical solutions of the present disclosure.

It should be noted that the terms "first", "second" and the like in the specification and claims of the present disclosure and the above-mentioned brief description of drawings are for the purpose of distinguishing similar objects, instead of necessarily describing a specific sequence or a successive order. It should be understood that the data used in such a way are interchangeable where appropriate, such that the embodiments of the present disclosure described herein can be implemented in a sequence other than those illustrated or described herein. The examples set forth in the following description of example embodiments do not represent all examples consistent with the present disclosure. Instead, they are merely examples of apparatuses and methods consistent with aspects related to the disclosure as recited in the appended claims.

The embodiments of the present disclosure provide a method for processing data, and an electronic device and a storage medium thereof, in order to at least enrich the interactive modes provided by live video applications on smart terminals.

Figure 1:
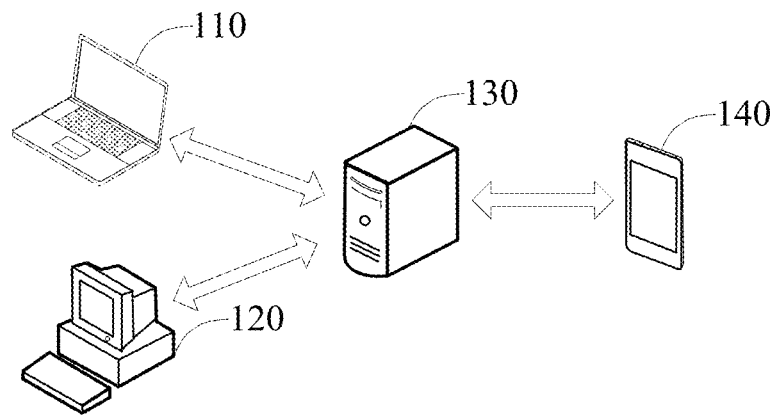
FIG. 1 illustrates a schematic diagram of a system where a method for processing data is applied according to an embodiment of the present disclosure.

First, an application scenario of the embodiments of the present disclosure is introduced. FIG. 1 illustrates a schematic diagram of a system in which the method for processing data is applied according to an embodiment of the present disclosure. The system may include a server 130 and a plurality of terminals, wherein the plurality of terminals may include a terminal 110, a terminal 120, and a terminal 140. The method for processing data according to the embodiment of the present disclosure may be applicable to the server 130, and may also be applicable to any one of the plurality of terminals.

When the method for processing data is applicable to the server 130, the server 130 may acquire an interactive message transmitted based on live streaming data by a terminal in communication with the server 130. For example, the interactive message includes real-time chat data, a gift message of a virtual item, and the like. Optionally, the real-time chat data may be data transmitted by a terminal used by an anchor by the server 130, or data transmitted by a terminal used by audience by the server 130. For example, the real-time chat data is barrage data in a live streaming image.

The interactive message being real-time chat data is taken as an example to show that the server 130 acquires the real-time chat data transmitted based on the live streaming data which includes initial pose data of the first virtual avatar, and then may extract the first feature data from the real-time chat data, then determine, based on the pre-established corresponding relationship between the feature data and the pose data of the first virtual avatar, the first pose data corresponding to the first feature data, and finally change the pose of the first virtual avatar based on the first pose data and transmit the first virtual avatar with the pose changed based on the first pose data to the terminal 110 (also referred to as a first terminal). In this way, the pose of the virtual avatar may be changed based on the chat data between the terminals, which may prevent the anchor from failing to interact with the audience in time, thereby increasing the interactive modes between the anchor and the audience, and improving the satisfaction of the audience.

When the method for processing data is applicable to any terminal, for example, the terminal 110, the terminal 110 is then a second terminal. The terminal 110 may receive the real-time chat data transmitted by the terminal 120 or the terminal 140 or both, and then may extract first feature data from the real-time chat data, and then determine, based on a pre-established corresponding relationship between feature data and the pose data of the first virtual avatar, first pose data corresponding to the first feature data, wherein the first virtual avatar is a pre-established virtual avatar in the terminal 110. Finally, a pose of the first virtual avatar is changed based on the first pose data, and the first virtual avatar with the pose changed based on the first pose data is transmitted to the terminal 120 or the terminal 140 or both. In this way, the pose of the virtual avatar may be changed based on the real-time chat data between the terminals, which may prevent the anchor from failing to interact with the audience in time, thereby increasing the interactive modes between the anchor and the audience, and improving the satisfaction of the audience.

Figure 2:
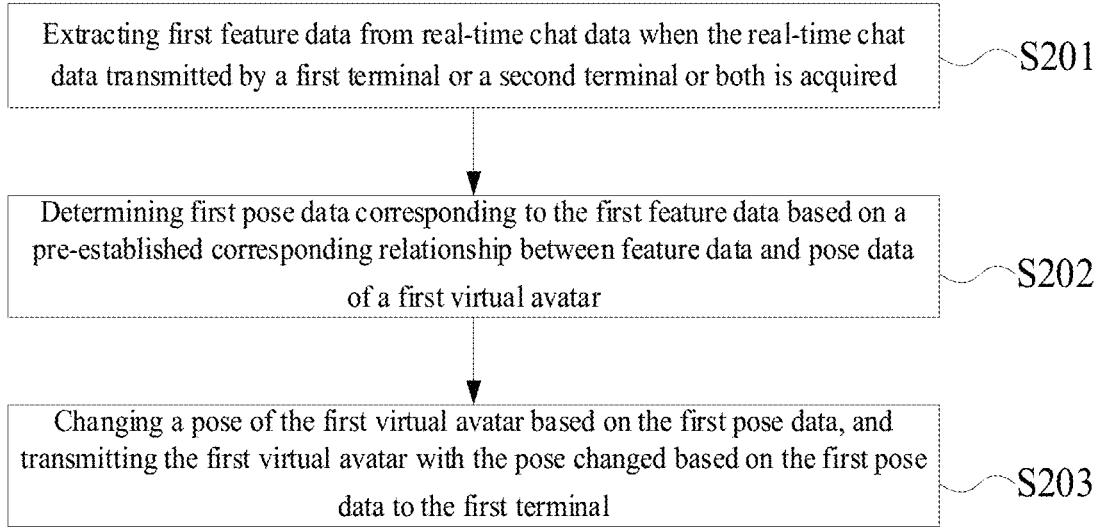
FIG. 2 illustrates a flowchart of a method for processing data applicable to a server according to an example embodiment.

In the following, a method for processing data applicable to a server is introduced. The server is in communication with a plurality of terminals, and the plurality of terminals at least include a first terminal and a second terminal. FIG. 2 illustrates a flowchart of a method for processing data applicable to a server according to an example embodiment. The method may include the following steps.

In S201, the server extracts first feature data from real-time chat data when acquiring the real-time chat data transmitted by a first terminal or the second terminal or both, wherein the real-time chat data includes: text chat data, gesture data, or voice chat data, or any combination thereof.

In some embodiments, the second terminal may typically transmit a room creation request to the server in order to establish a virtual room in the server, and then the first terminal may establish a communication with the server to allow a virtual identity of a user using the first terminal to join the virtual room. For example, the virtual room is a live streaming room of an anchor. After the virtual identity of the user of the first terminal joins the virtual room, the first terminal may transmit chat data to the room, and the second terminal may also transmit chat data to the virtual room, such that the user of the second terminal may chat with the user of the first terminal in real time, and the generated real-time chat data may be recorded in the server. Therefore, the server may acquire the real-time chat data transmitted by the first terminal or the second terminal or both.

In some embodiments, the user of the second terminal may be the anchor, and the user of the first terminal may be audience watching the live streaming video of the anchor.

In some embodiments, the real-time chat data may be chat data acquired from the first terminal or the second terminal or both after an authorization is obtained from the audience of the first terminal or the anchor of the second terminal or both.

After acquiring the real-time chat data, the server may analyze the real-time chat data and analyze feature data of the real-time chat data in order to enable automatic interaction with the audience. The feature data may be keywords or key terms or both.

In some embodiments, a keyword library, or a key term library or both may be pre-stored in the server. When the real-time chat data is text chat data, the server may perform word segmentation on the real-time chat data at first, and then search a key term or a keyword or both corresponding to each term in the real-time chat data in the pre-established keyword library, or key term library, or both. As a result, the feature data of the real-time chat data may be acquired.

When the real-time chat data is voice chat data, the voice chat data may be converted into text chat data at first, and then feature data, i.e., the first feature data, corresponding to the voice chat data may be determined using the pre-established keyword library, or key term library, or both.

When the real-time chat data is gesture data, feature data, i.e., the first feature data, corresponding to the gesture data may be searched in a pre-established library of the corresponding relationship between gesture data and feature data.

In S202, the server determines, based on a pre-established corresponding relationship between the feature data and pose data of the first virtual avatar, first pose data corresponding to the first feature data.

After the first feature data is acquired, in order to enable the preset virtual avatar to interact with the audience, the first pose data corresponding to the first feature data may be determined in this step based on the pre-established corresponding relationship between the feature data and the pose data of the first virtual avatar.

In some embodiments, a plurality of feature data and a plurality of pose data may be pre-stored in the server, and each feature data corresponds to one pose data. For example, the feature data "laugh", "haha", "standing", "stand up", "turn around", and "turn over" may be stored. Also, pose data corresponding to the feature data such as "laugh" and "haha", pose data corresponding to the feature data "standing" and "stand up", pose data corresponding to the feature data "turned around", and pose data corresponding to the feature data "turn over" may be stored.

In some embodiments, the first virtual avatar may be a virtual avatar stored in the server, and the virtual avatar may be preset by a staff member.

In S201-S202, an example in which the server acquires the interactive message, extracts the first feature data from the interactive message, and determines the first pose data based on the first feature data is illustrated by taking the interactive message as real-time chat data as an example. In example, the interactive message is transmitted based on live streaming data, which includes initial pose data of the first virtual avatar; and the first pose data corresponds to the first feature data. In some embodiments, the interactive message may also be a gift message of a virtual item, or the interactive message may also be a like message and the like. The type of the interactive message is not specifically defined in the embodiments of the present application.

In S203, the server changes the pose of the first virtual avatar based on the first pose data, and transmits the first virtual avatar with the pose changed based on the first pose data to the first terminal S203 provides example in which the server determines the pose of the first virtual avatar based on the first pose data, and transmits the first virtual avatar. Optionally, the server directly transmits the first virtual avatar in a data package to the first terminal; or, the server adds the first virtual avatar to the live streaming data which is currently pulled by the first terminal, such that the effect of inserting the first virtual avatar in the live streaming video stream in real time can be achieved.

After the server determines the first pose data corresponding to the first feature data, the first pose data may be used to change the pose of the pre-established virtual avatar, that is, to change the pose of the first virtual avatar, thereby acquiring the first virtual avatar with the pose changed; and then the first virtual avatar with the pose changed based on the first pose data may be transmitted to the first terminal, thereby allowing the virtual avatar to interact with the audience of the first terminal based on the real-time chat data transmitted by the first terminal or the second terminal or both.

For example, assuming that the determined first pose data corresponds to the first feature data "Bend over to salute", the pose of the virtual avatar may be changed so as to change the pose of the virtual avatar to a bent-over pose, and then, the bent-over pose of the virtual avatar may be transmitted to the first terminal, thereby allowing the virtual avatar to interact with the user of the first terminal.

For another example, assuming that the determined first pose data corresponds to the first feature data "Bend over to salute", the first pose data is directly transmitted to the first terminal, and the first terminal changes the pose of the first virtual avatar according to the first pose data, such that the pose of the first virtual avatar is changed to the bent-over pose, thereby allowing the virtual avatar to interact with the user of the first terminal.

In some embodiments, in addition to transmitting the first virtual avatar with the pose changed based on the first pose data to the first terminal, the server may also transmit the first virtual avatar with the pose changed based on the first pose data to the second terminal, in order to enable a user of the second terminal to watch the first virtual avatar with the pose changed based on the first pose data, and to have a better interaction with the user of the first terminal based on the first virtual avatar with the pose changed.

In some embodiments, the server may first transmit the first virtual avatar with the pose changed to the first terminal, and then transmit the first virtual avatar with the pose changed to the second terminal; or the server may also first transmit the first virtual avatar with the pose changed to the second terminal, and then to the first terminal; and the service may also transmit the first virtual avatar with the poser changed to the first terminal and the second terminal at the same time. A sequence for transmitting the first virtual avatar with the pose changed is not specifically defined in the embodiments of the present disclosure.

In an example scenario, for either the first terminal or the second terminal, a live streaming image may be displayed in a live streaming video application based on live streaming data. Optionally, the first virtual avatar is displayed in the live streaming image based on initial pose data. That is, the live streaming image includes the first virtual avatar. Next, the server acquires any interactive message in the live streaming image, extracts the first feature data from the interactive message, determines the first pose data based on the first feature data, and transmits the first pose data to the terminal, wherein the terminal receives the first pose data of the first virtual avatar, and the first pose data is triggered by the interactive message. After receiving the first pose data, the terminal may display the first virtual avatar in the live streaming image based on the first pose data.

With the method for processing data according to the embodiments of the present disclosure, when the anchor is chatting with the audience, the real-time chat data transmitted by the first terminal or the second terminal or both can be acquired, the first feature data can be extracted from the real-time chat data, and then, the first pose data corresponding to the first feature data can be determined based on the pre-established corresponding relationship between the feature data and the pose data of the first virtual avatar; and finally, the pose of the first virtual avatar can be changed based on the first pose data, and the first virtual avatar with the pose changed based on the first pose data can be transmitted to the first terminal. As a result, the virtual avatar can also interact with the audience, and an interactive mode other than the interactive mode of the anchor interacting with the audience can thus be provided. Therefore, the anchor can be prevented from failing to interact with the audience in time, thereby avoiding the dissatisfaction of the audience.

Figure 3:
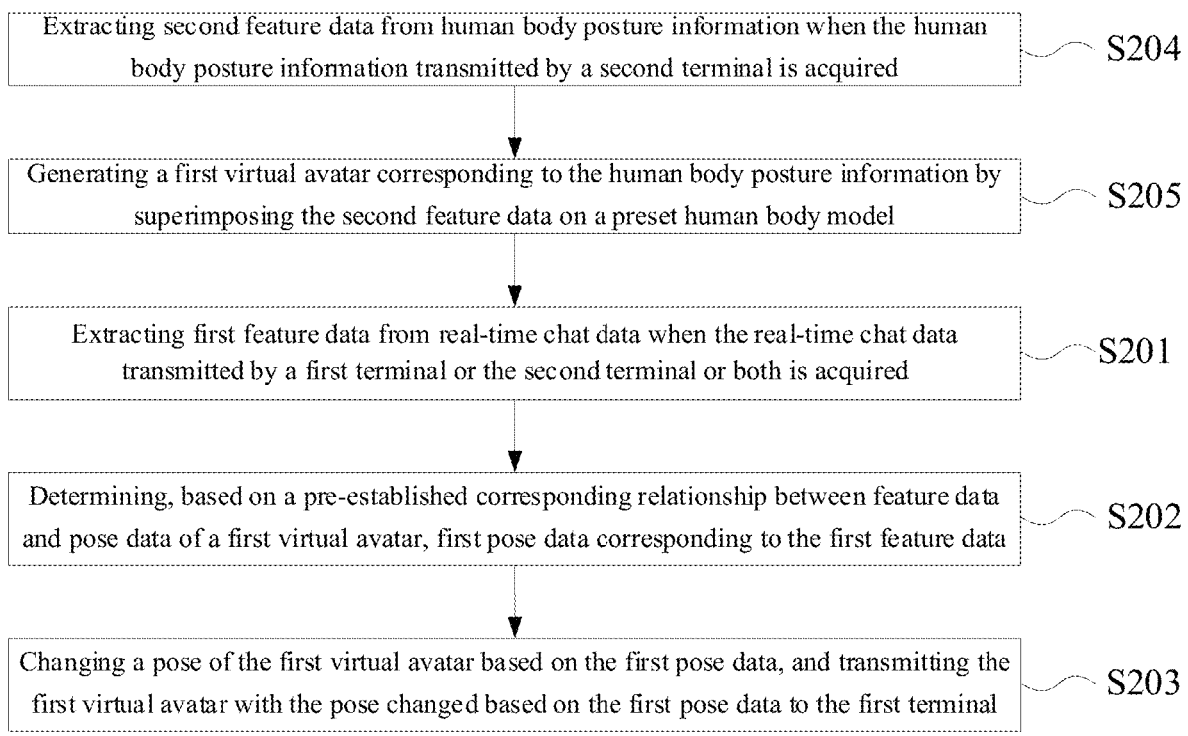
FIG. 3 illustrates a flowchart of a method for processing data applicable to a server according to an example embodiment.

In some embodiments, except that the serve makes use of a pre-established template virtual avatar, an embodiment of the present disclosure further provides an example based on the method for processing data as illustrated in FIG. 2. FIG. 3 illustrates a flowchart of a method for processing data applicable to a server according to an example embodiment. In S201, before extracting the first feature data from the real-time chat data when the real-time chat data transmitted by the first terminal or the second terminal or both is acquired, the method may further include the following step.

In S204, the server extracts second feature data from human body posture information when acquiring the human body posture information transmitted by a second terminal.

The second feature data includes feature data based on the first human body posture information of a target user, wherein the target user refers to an anchor.

Optionally, the server receives a virtual avatar creation request from the second terminal, with the virtual avatar creation request carrying first human body posture information of the target user; or the server directly receives the first human body posture information transmitted by the second terminal; or the server identifies the first human body posture information from live streaming data when pulling the live streaming data from the second terminal for the first time. A method or acquiring the first human body posture information is not specifically defined in the embodiments of the present disclosure.

In S205, the server generates a first virtual avatar corresponding to the human body posture information by superimposing the second feature data on a preset human body model.

In some embodiments, in addition to using pre-stored virtual avatars in the server, the anchor may also create a virtual avatar in the server based on his or her own form. To this end, the anchor may transmit a virtual avatar creation request to the server using the second terminal. After receiving the virtual avatar creation request, the server may acquire the first human body posture information of the anchor, where the first human body posture information may include either a whole-body posture or a head posture of the anchor.

After acquiring the first human body posture information of the anchor, the server may perform feature analysis on the first human body posture information to extract feature data, i.e., second feature data, from the first human body posture information, in order to generate the first virtual avatar of the anchor based on the first human body posture information. For example, when the first human body posture information is the whole-body posture, the server may extract human body key-points and head key-points of the anchor from the first human body posture information; and when the first human body posture information is the head posture, the server may extract the head key-points of the anchor from the first human body posture information.

After extracting the second feature data corresponding to the first human body posture information, the server may acquire a preset human body model from locally pre-stored human body models, and superimpose the second feature data on the preset human body model, such that the first virtual avatar corresponding to the first human body posture information may be generated.

In the above process, superimposing the second feature data of the first human body posture information on the preset human body model refers to adjusting relevant parameters of the preset human body model to match the second feature data of the first human body posture information, such that the first virtual avatar corresponds to the first human body posture information. For instance, when the second feature data includes the human body key-points and the head key-points, human body key-points during the initialization and head key-points during the initialization of the preset human body model are replaced with the human body key-points and the head key-points included in the second feature data, thereby obtaining the first virtual avatar corresponding to the first human body posture information. In other words, the first virtual avatar is determined based on the human body model and the second feature data.

In some embodiments, after extracting the second feature data corresponding to the first human body posture information, the server may transmit a plurality of locally pre-stored human body models to the second terminal, such that the anchor of the second terminal may select one from the plurality of human body models. After receiving the human body model selected by the anchor from the second terminal, the server may superimpose the second feature data on the human body model selected by the anchor, thereby obtaining the first virtual avatar corresponding to the first human body posture information of the anchor. For example, the extracted human body key-points may be superimposed on the human body key-points in the human body model to replace the human body key-points of the human body model; or the head key-points of the anchor may also be used to replace the head key-points in the human body model, such that the first virtual avatar corresponding to the first human body posture information of the anchor may be acquired.

In some embodiments, the first human body posture information may be a picture transmitted by the second terminal. Then, after acquiring the picture transmitted by the second terminal, the server may acquire a face feature and a human body feature in the image by face feature recognition and human body feature recognition on the image. The face feature and the human body feature are determined as the second feature data. In other words, the second feature data includes the face feature and the human body feature of the target user (i.e., the anchor).

In some embodiments, the preset human body model may be a human body model composed of a plurality of preset model limbs. In one aspect of the present disclosure, the server may pre-assemble a human body model based on a voice of the anchor using the second terminal.

For example, the anchor may input a voice of a model limbs to be selected into the second terminal. After acquiring the voice, the second terminal transmits the voice to the server, wherein the server acquires the voice and acquires a voice feature of the voice by recognizing the voice. Then, model limbs corresponding to the voice feature are searched from the pre-established human body model limb library, and after the model limbs are acquired, the model limbs may be combined to acquire the preset human body model; and finally, the face feature and the human body feature may be superimposed on the preset human body model to generate a first virtual avatar corresponding to the face feature and the human body feature. In other words, the human body model is determined based on the model limbs. The model limbs are searched from a human body model limb library based on a voice feature, wherein the voice feature is intended to indicate an acoustic feature of a limb selection voice command input by the target user.

According to the embodiments of the present disclosure, the first virtual avatar may be made closer to the form of the anchor, such that the interaction between the virtual avatar and the audience is closer to the interaction between the anchor and the audience, thereby increasing the interest of the audience.

In some embodiments, in order to increase the flexibility in setting the virtual avatar, the anchor of the second terminal may also adjust the generated first virtual avatar after the step of generating the first virtual avatar corresponding to the human body posture information. To this end, the anchor may transmit an avatar adjustment request to the server using the second terminal, such that the server may acquire dimension parameters of the generated first virtual avatar. The dimension parameters of the virtual avatar may include: head height, face width, interpupillary distance and other parameters.

Then, the server may transmit the dimension parameters of the first virtual avatar to the second terminal, and the anchor of the second terminal may make an adjustment based on the parameters. After the anchor of the second terminal makes the adjustment, the second terminal may generate avatar change operation information when acquiring the adjusted parameters, and then transmit the avatar change operation information to the server.

The server acquires the avatar change operation information transmitted by the second terminal, and changes, based on the avatar change operation information, the generated first virtual avatar corresponding to the first human body posture information. That is, the server changes the first virtual avatar based on the avatar change operation information. That is, the first virtual avatar is adjusted using the adjusted parameters, such that the changed first virtual avatar may be acquired.

In some embodiments, the dimension parameters of the changed first virtual avatar may change over time in order to enable the changed first virtual avatar to better interact with the audience and increase the interest of the audience.

For example, with the extension of the time for the anchor to use the second terminal, the dimension parameters of the changed first virtual avatar may be increased or decreased, such that the changed first virtual avatar becomes taller, shorter, fatter, thinner, etc. over time. In other words, the first virtual avatar has the dimension parameters changing over time.

In some embodiments, as time changes, an item transmitted by the first terminal may change, the number of first terminals may also change, and the number of audiences following the anchor of the second terminal may change accordingly. For example, the audiences of the first terminal may give more gifts to the anchor of the second terminal, and more audiences may watch the live streaming of the anchor of the second terminal using the first terminal, etc. Therefore, the dimension parameters of the changed first virtual avatar may be changed as item information changes, as the number of first terminals changes, or also as the number of audiences following the anchor of the second terminal changes. A method for changing the dimension parameters is not specifically defined in the embodiments of the present disclosure.

In some embodiments, when the first terminal used by the audience is a terminal with a virtual reality technology, the second terminal may acquire scenario information of a scenario where the anchor is located in real time, and transmit the scenario information to the server. Then, the server may generate a virtual scenario corresponding to the scenario information, generate a three-dimensional first virtual avatar based on the human body posture information, and superimpose the three-dimensional first virtual avatar on the virtual scenario based on a position of the anchor in the scenario. In this way, a virtual scenario containing the first virtual avatar may be generated, such that the audience may interact with the anchor of the second terminal by using the terminal with the virtual reality technology.

In some embodiments, when the first terminal used by the audience is a terminal with an augmented reality technology, the second terminal may acquire scenario information of a scenario where the anchor is located in real time, and transmit the scenario information to the server. The server may superimpose a generated first virtual avatar on the scenario information, such that the audience of the first terminal may watch the scenario information superimposed with the first virtual avatar by using the terminal with the augmented reality technology. That is, the audience may watch a scenario where the scenario wherein the anchor is located is superimposed on the first virtual avatar of the anchor.

In some embodiments, according to a method for processing data applicable to a server in an embodiment of the present disclosure, history data in the second terminal may also be acquired, and then a first virtual avatar may be generated according to the history data. In other words, the first virtual avatar is generated based on the history data. Moreover, the history data at least includes at least one of history virtual avatar data or history interactive messages. For example, the history interactive messages include history chat data, or the history interactive messages include history gift messages of virtual items.

In some embodiments, when the history data in the second terminal is history virtual avatar data, the history virtual avatar data may be analyzed to obtain a virtual avatar commonly used by the anchor, corresponding to the second terminal; and then the first virtual avatar may be generated according to the virtual avatar commonly used by the anchor.

When the history data in the second terminal is history chat data, the history chat data may be analyzed to obtain interests, preferences and personality of the anchor, corresponding to the second terminal, such that the first virtual avatar consistent with the interests, preferences and personality of the anchor may be generated. In this way, the first virtual avatar may be automatically generated without the operation of the anchor, thereby improving the convenience in generating the first virtual avatar.

In some embodiments, when acquiring the history data, the second terminal may first display user data acquisition solicitation information, such that the anchor may choose whether to allow the second terminal to acquire the history data. When the anchor allows the second terminal to acquire user data, the second terminal may acquire history data about the anchor. When the anchor does not allow the second terminal acquires the user data, the second terminal may not acquire the history data about the anchor, thereby guaranteeing the security of the user data of the anchor.

Figure 4:
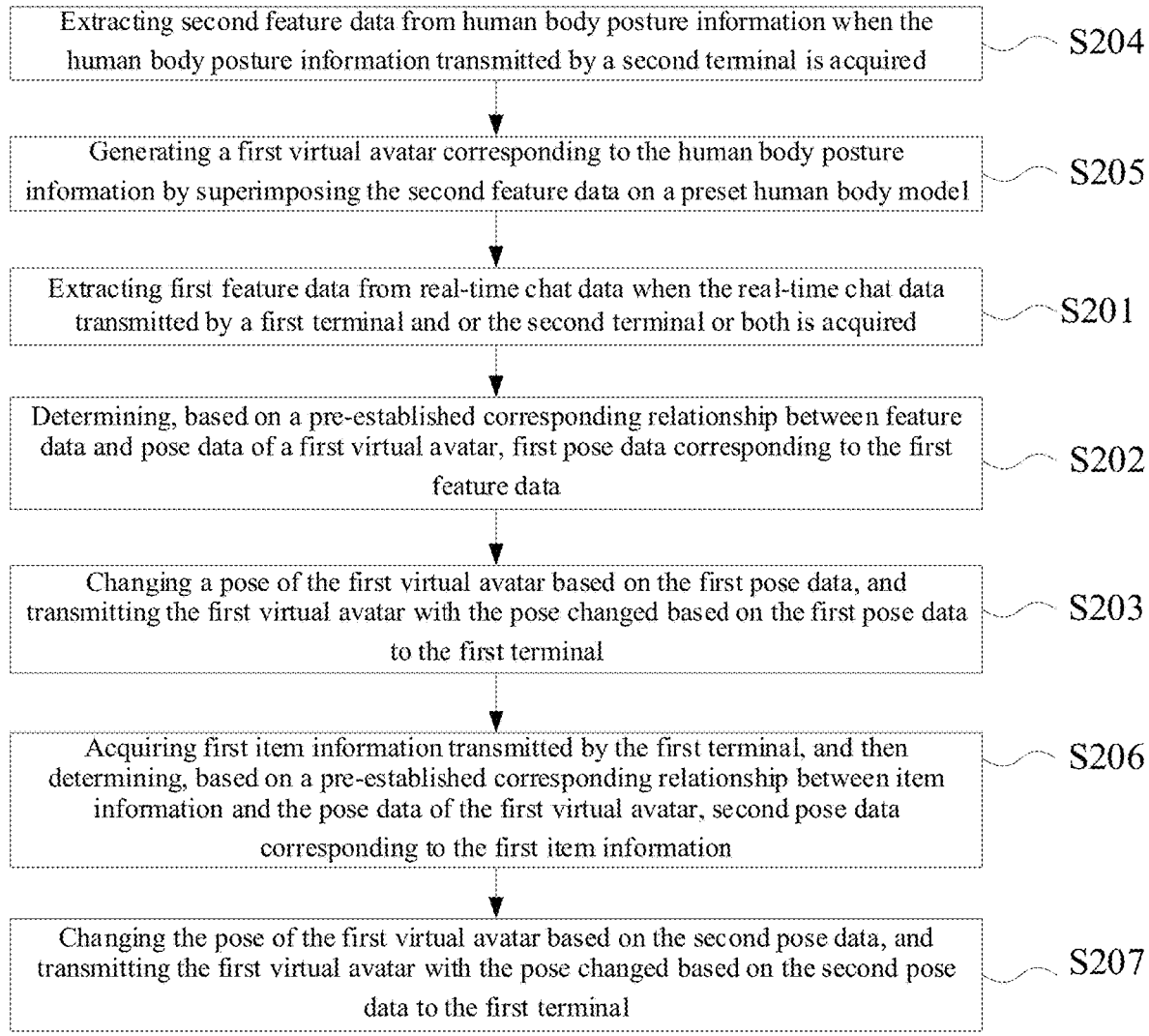
FIG. 4 illustrates a flowchart of a method for processing data applicable to a server according to an example embodiment.

Based on the method for processing data as illustrated in FIG. 3, an embodiment of the present disclosure further provides an example. FIG. 4 illustrates a flowchart of a method for processing data applicable to a server according to an example embodiment. After S203 in which the pose of the first virtual avatar is changed based on the first pose data and the first virtual avatar with the pose changed based on the first pose data is transmitted to the first terminal, the method may further include the following steps.

In S206, the server acquires first item information transmitted by the first terminal, and then determines second pose data corresponding to the first item information based on a pre-established corresponding relationship between item information and the pose data of the first virtual avatar.

The first item information also refers to a gift message of a virtual item, and the second pose data also refers to the first pose data corresponding to the gift message of the virtual item.

S206 provides an example of determining the first pose data according to the virtual item with the interactive message being the gift message of the virtual item, by way of example. In other words, the server may not only determine the first pose data based on the real-time chat data, but also determine the first pose data based on the gift message of the virtual item. Various types of interactive messages transmitted based on the live streaming data may trigger the acquisition of the first pose data.

In S207, the server changes the pose of the first virtual avatar based on the second pose data, and transmits the first virtual avatar with the pose changed based on the second pose data to the first terminal.

In some embodiments, the audience of the first terminal may give an item to the anchor when interacting with the anchor of the second terminal; and the audience of the first terminal may tap an item in the first terminal and tap "Gift" in the first terminal to trigger the first terminal to transmit first item information (that is, the gift message of the virtual item) to the server. Here, the server may receive the first item information (that is, the gift message of the virtual item) transmitted by the first terminal.

In order to enable the virtual avatar to interact with the audience after the audience gives away the item, a corresponding relationship between the virtual item and the pose data of the first virtual avatar may be established in advance. When receiving the first item information, the server may determine, based on the pre-established corresponding relationship between the virtual item and the pose data, second pose data corresponding to the first item information, then change the pose of the first virtual avatar by using the second pose data, and after the pose of the first virtual avatar is changed, transmit the first virtual avatar with the pose changed based on the second pose data to the first terminal. In this way, the interaction between the first virtual avatar and the audience may correspond to the virtual item triggered by the first terminal.

Figure 5:
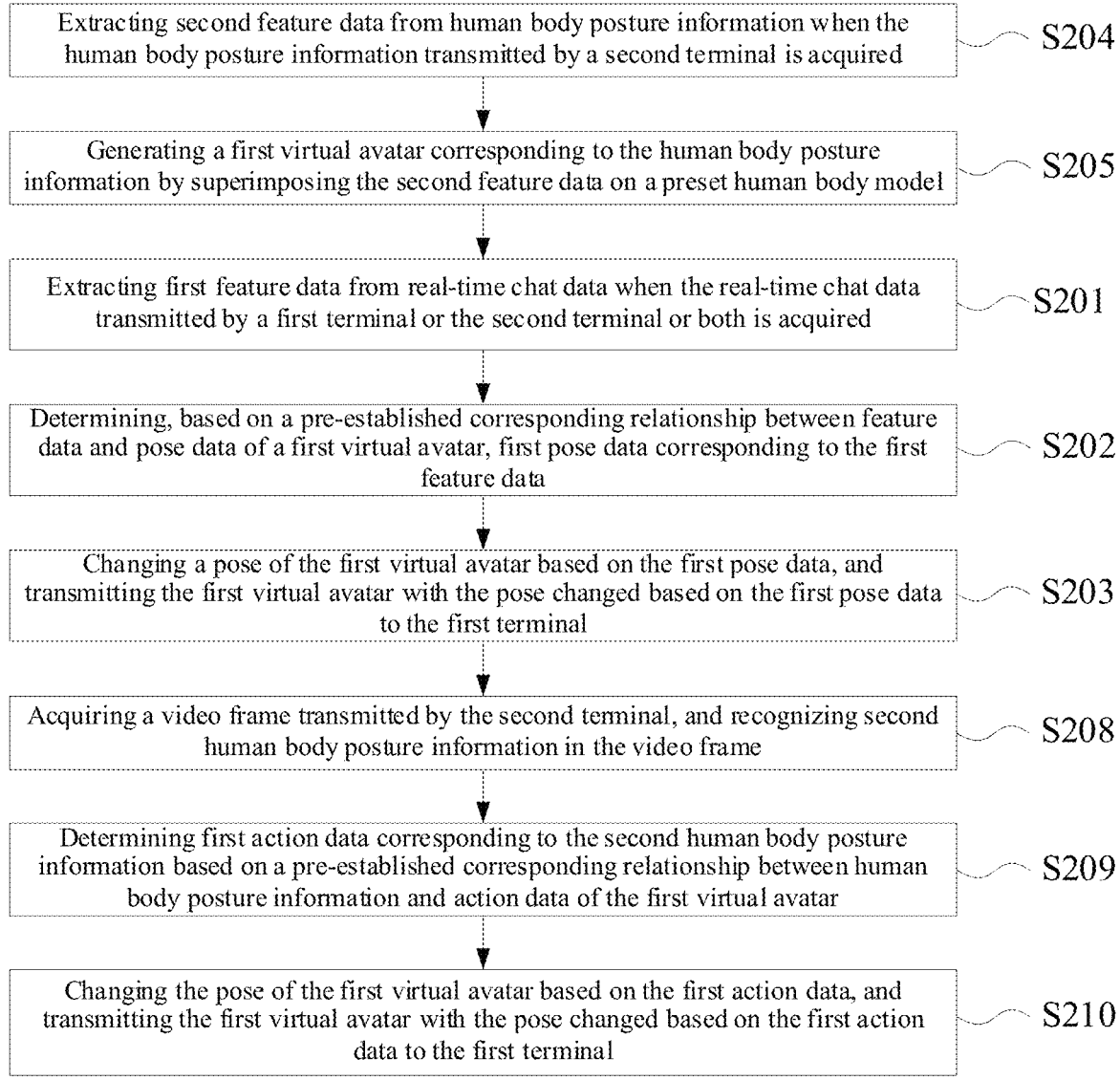
FIG. 5 illustrates a flowchart of a method for processing data applicable to a server according to an example embodiment.

Based on the method for processing data as illustrated in FIG. 3, an embodiment of the present disclosure further provides an example. FIG. 5 illustrates a flowchart of a method for processing data applicable to a server according to an example embodiment. After S203 in which the pose of the first virtual avatar is changed based on the first pose data and the first virtual avatar with the pose changed based on the first pose data is transmitted to the first terminal, the method may further include the following steps.

In S208, the server acquires a video frame transmitted by the second terminal, and recognizes second human body posture information in the video frame.

S208 provides an example in which the server recognizes second human body posture information of a target user based on live streaming data. The target user refers to the anchor. Since the live streaming data also refers to live streaming video stream transmitted from the second terminal to the server, the server may recognize the second human body posture information of the target user in any video frame in the live streaming video stream in real time.

In S209, the server determines, based on a pre-established corresponding relationship between human body posture information and action data of the first virtual avatar, first action data corresponding to the second human body posture information.

In other words, the server determines, based on the second human body posture information the first action data corresponding to the second human body posture information.

In S210, the server changes the pose of the first virtual avatar based on the first action data, and transmits the first virtual avatar with the pose changed based on the first action data to the first terminal.

In some embodiments, the server changes the pose of the first virtual avatar based on the first action data, and then may transmit the first virtual avatar with the pose changed to the first terminal. S210 is similar to S207, which is not repeated here.

In some embodiments, the first virtual avatar may interact with the anchor of the second terminal in addition to interacting with the audience of the first terminal, and the audience of the first terminal may watch an interaction process between the first virtual avatar and the anchor of the second terminal. To this end, the server may acquire a video frame of the second terminal, where the video frame of the second terminal may be captured by the anchor of the second terminal by using a camera of the second terminal, and then actively transmitted to the server; and the video frame may also be acquired by the second terminal which captures a human body posture of the anchor of the second terminal by using the camera of the second terminal, after the second terminal receives the human body posture information acquisition request transmitted by the server.

After receiving the video frame transmitted by the second terminal, the server may recognize the video frame to recognize second human body posture information in the video frame. In some embodiments, human body key-points in the video frame may be recognized by the server, and then taken as the second human body posture information. Or, head key-points in the video frame are recognized, and then taken as the second human body posture information.

In some embodiments, a corresponding relationship between the human body posture information and action data of the first virtual avatar may be established in advance, in order to enable the pose of the second virtual avatar to correspond to the human body posture of the anchor when the second virtual avatar interacts with the anchor. Then, the server may determine, based on the pre-established corresponding relationship between the human body posture information and the action data of the first virtual avatar, first action data corresponding to the second human body posture information.

After determining the first action data corresponding to the second human body posture information, the server may change the pose of the first virtual avatar based on the first action data, and transmit the first virtual avatar with the pose changed based on the first action data to the first terminal. In this way, the audience using the first terminal may watch an interaction process between the anchor using the second terminal and the first virtual avatar, thereby increasing the interest of the audience in watching and improving viewing experience of the audience.

In some embodiments, when the first virtual avatar with the pose changed based on the first action data is transmitted to the first terminal, the first virtual avatar with the pose changed based on the first action data may be superimposed on the video frame and then transmitted to the first terminal. In other words, the server adds the first virtual avatar with the pose changed based on the first action data to the live streaming data, and transmits the live streaming data, such that the number of communications between the server and the terminal as well as the communication overhead can be reduced.

In some embodiments, the first action data may be position data or distance data between respective key-points of the first virtual avatar.

In some embodiments, the first virtual avatar with the pose changed based on the first action data may also be transmitted to the second terminal, in order to enable the anchor using the second terminal to watch the interaction process between himself or herself with the virtual avatar. In this way, the anchor may better interact with the audience.

Figure 6:
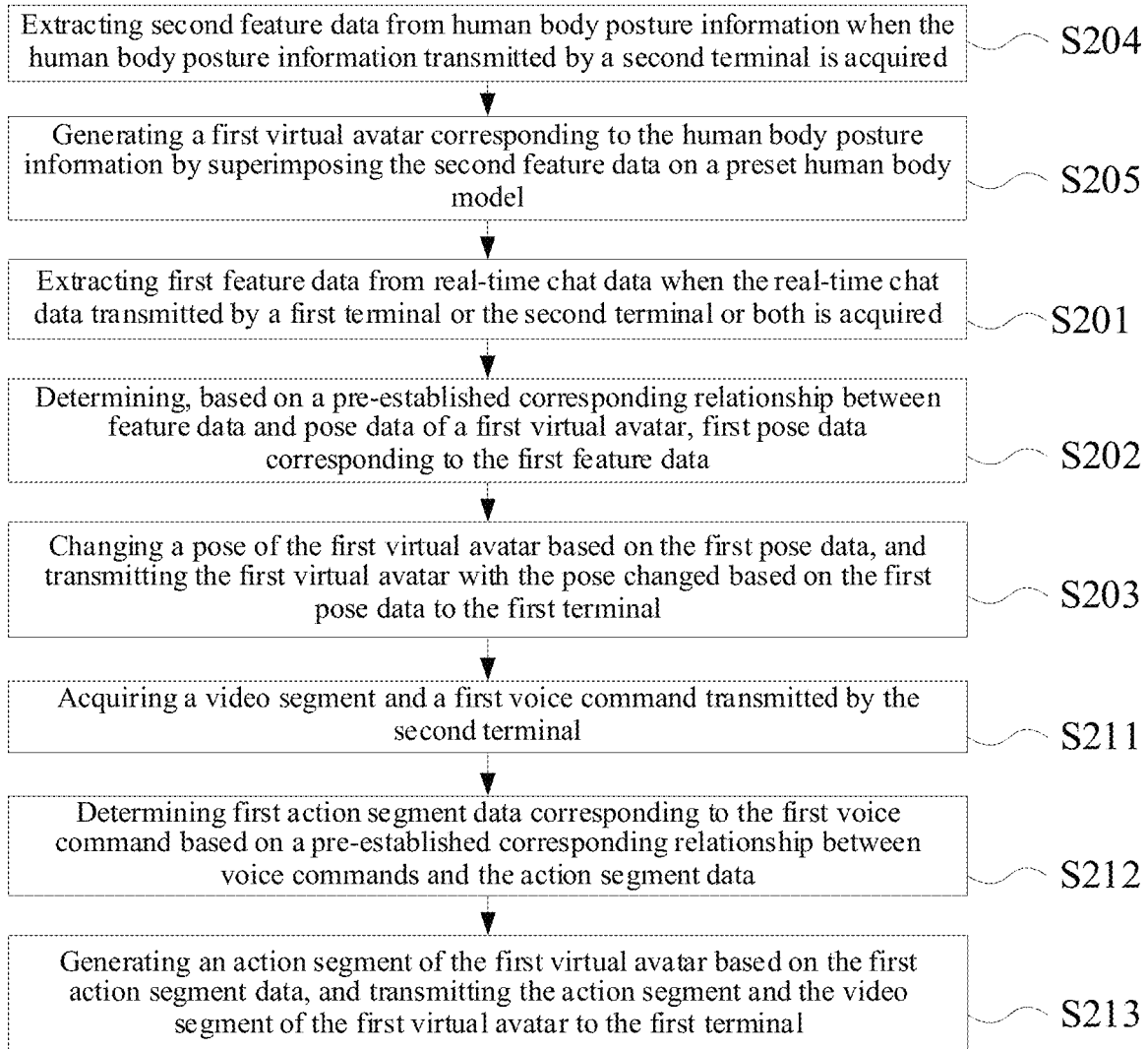
FIG. 6 illustrates a flowchart of a method for processing data applicable to a server according to an example embodiment.

In some embodiments, to allow the first virtual avatar to interact with the anchor based on voice information of the anchor using the second terminal in addition to interacting with the anchor based on the human body posture information of the anchor, an embodiment of the present disclosure further provides an example based on the method for processing data as illustrated in FIG. 3. FIG. 6 illustrates a flowchart of a method for processing data applicable to a server according to an example embodiment. After S203 in which the pose of the first virtual avatar is changed based on the first pose data and the first virtual avatar with the pose changed based on the first pose data is transmitted to the first terminal, the method may further include the following steps.

In S211, the server acquires a video segment and a first voice command transmitted by the second terminal.

S211 provides an example in which the server acquires a first voice command in the live streaming data. In this embodiment of the present disclosure, a description is made by using the live streaming data as a video segment, by way of example.

In S212, the server determines, based on a pre-established corresponding relationship between voice commands and the action segment data, first action segment data corresponding to the first voice command.

In other words, the server determines the first action segment data based on the first voice command, wherein the first action segment data corresponds to the first voice command.

In S213, the server generates a first action segment of the first virtual avatar based on the first action segment data, and transmits the first action segment of the first virtual avatar and the video segment to the first terminal.

In other words, the server generates the first action segment based on the first action segment data, and changes the pose of the first virtual avatar based on the first action segment.

In some embodiments, the server may pre-store voice commands and action segment data corresponding to the voice commands, in order to enable the first virtual avatar to interact with the anchor based on the voice command of the anchor.

The anchor may transmit one voice command and one video segment to the server by using the second terminal; the server may receive the video segment and the first voice command as transmitted by the second terminal, and then determine, based on a pre-established corresponding relationship between the voice command and the action segment data, the first action segment data corresponding to the first voice command. Then, a first action segment of the first virtual avatar may be generated based on the first action segment data, and finally, the first action segment and the video segment of the first virtual avatar are transmitted to the first terminal.

In some embodiments, the first action segment data may be positions or distances between the respective key-points of the first virtual avatar at different time.

For example, assuming the second terminal transmits a video segment of "reach out the palm" and transmits a voice command of "dance", the server may determine the first action segment data corresponding to the voice command of "dance" after receiving the voice command of "dance", then may generate a first action segment of a "dancing" first virtual avatar, and finally, transmit the first action segment of "dance" and the video segment of "reach out the palm" to the first terminal together. In this way, after receiving the first action segment, the first terminal displays the first action segment of the first virtual avatar based on the live streaming image, where the first action segment is triggered by the first voice command, such that the audience using the first terminal may watch the process of the first virtual avatar interacting with the anchor based on the voice command of the anchor, thereby improving the interactive mode between the first virtual avatar and the anchor.

In some embodiments, the server may transmit the first action segment of the first virtual avatar and the video segment to the second terminal, in order to enable the anchor using the second terminal to watch the process of the first virtual avatar interacting with the first virtual avatar based on the voice command.

Figure 7:
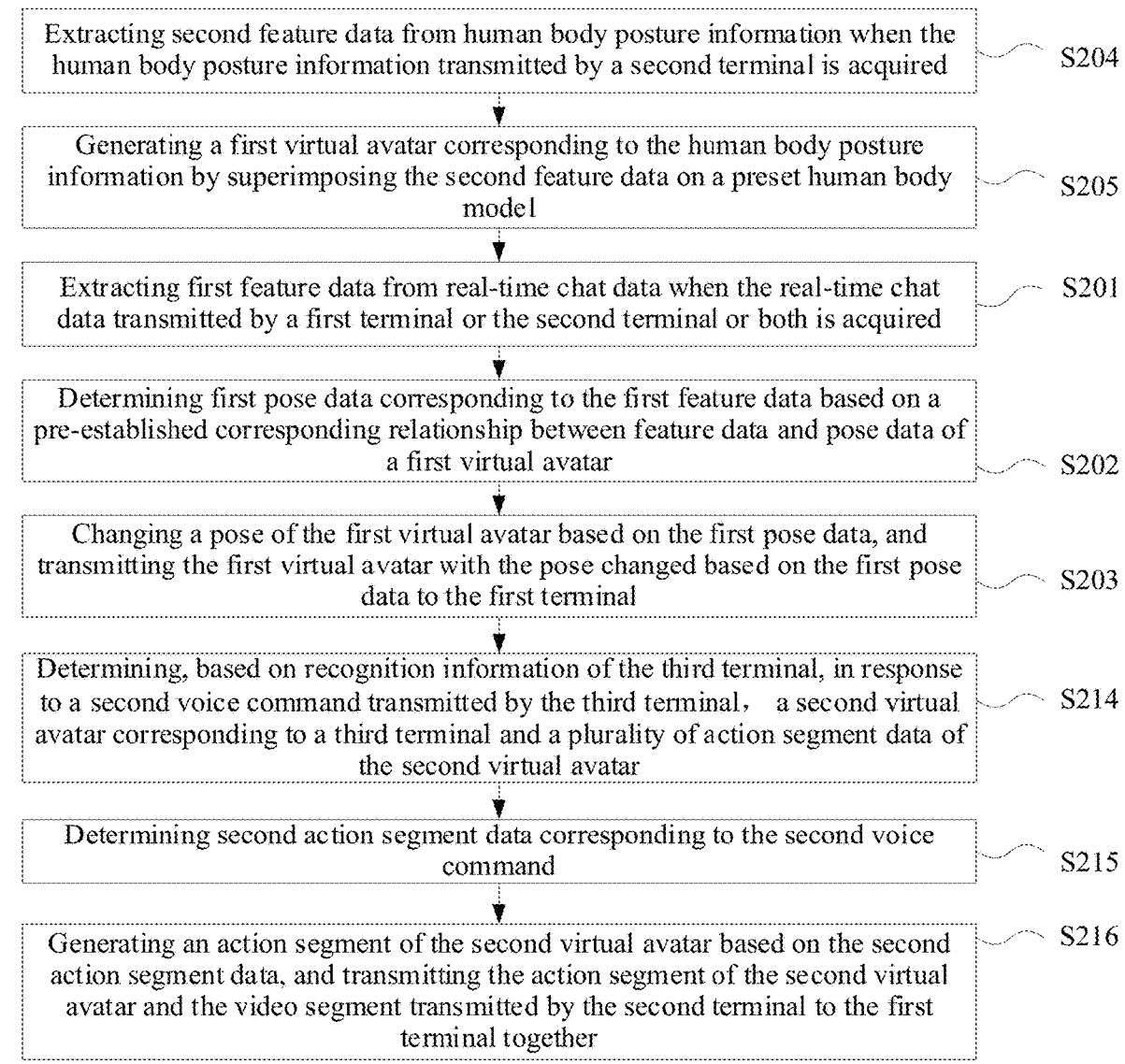
FIG. 7 illustrates a flowchart of a method for processing data applicable to a server according to an example embodiment.

In some embodiments, in order to increase the interest of the audience, an anchor of the second terminal may interact not only with the first virtual avatar and audience of the first terminal, but also with a virtual avatar of another anchor. In this regard, the server may also be connected in a communication manner with a third terminal which may be a terminal used by any one of other anchors. In this regard, the embodiment of the present disclosure also provides an example based on the method for processing data as illustrated in in FIG. 3. FIG. 7 illustrates a flowchart of a method for processing data applicable to a server according to an example embodiment. In S203, a pose of a first virtual avatar is changed based on first pose data, and after the first virtual avatar whose pose is changed based on the first pose data is transmitted to the first terminal, the method further includes the following steps.

In S214, when the server receives a second voice command transmitted by a third terminal, a second virtual avatar corresponding to the third terminal and a plurality of action segment data of the second virtual avatar are determined based on identification information of the third terminal.

In S215, second action segment data corresponding to the second voice command is determined by the server.

In S216, the second action segment of the second virtual avatar is generated by the server based on the second action segment data, and the second action segment of the second virtual avatar and a video segment transmitted by the second terminal are transmitted to the first terminal.

In some embodiments, before the anchor of the second terminal interacts with the avatar of another anchor who may use his or her own terminal to transmit a voice command to the server. For example, a third terminal may be used to transmit a second voice command to the server. Therefore, the server may receive the second voice command transmitted by the third terminal.

After the server receives the second voice command transmitted by the third terminal, the second virtual avatar corresponding to the third terminal and the action segment data of a plurality of action segments which can be used by the second virtual avatar may be determined based on identification information of the third terminal, in order to determine the virtual avatar corresponding to the anchor who uses the third terminal. The server may store a second virtual avatar corresponding to the identification information of the third terminal, and a plurality of action segment data of the second virtual avatar.

After determining the second virtual avatar corresponding to the third terminal, the server may determine, based on the second voice command transmitted by the third terminal, the second action segment data corresponding to the second voice command from the plurality of action segment data of the second virtual avatar. Then, the second action segment data and the second virtual avatar may be used to generate the action segment of the second virtual avatar.

In some embodiments, the second action segment data may be positions of or distances between key points of the second virtual avatar corresponding to different moments.

After generating the action segment of the second virtual avatar, the server may transmit the action segment of the second virtual avatar and the video segment received by the server from the second terminal to the first terminal, such that the audience of the first terminal may watch the process of interaction between the anchor of the second terminal and the second virtual avatar corresponding to the third terminal, so as to increase the watching interest of the audience. Interactive methods between the anchor the audience are increased.

In some embodiments, it is also possible that the second virtual avatar may be superimposed on the video segment transmitted by the second terminal and transmitted to the first terminal by the server.

In some embodiments, after the action segment of the second virtual avatar and the video segment transmitted by the second terminal are transmitted together to the first terminal by the server, the action segment of the second virtual avatar and the video segment of the second terminal may also be transmitted to the second terminal or the third terminal or both by the above server. The anchor of the second terminal or the anchor of the third terminal or both are enabled to watch the process of interaction between the anchor of the second terminal and the second virtual avatar.

In the above process, a joint live streaming initiated by the third terminal to the second terminal is illustrated as an example. In some embodiments, if the second terminal serves as an initiator of the joint live streaming, the second terminal may transmit live streaming data carrying the second voice command to the server. The server receives the second voice command in the live streaming data, and determines a target account indicated by the second voice command based on the second voice command, under an assumption that a terminal device corresponding to the target account is a third terminal.

In some embodiments, the second voice command is a voice command for joint live streaming with the target account, and at this moment the server may determine the target account based on smart voice recognition. Next, the server acquires second action segment data which correspond to the first and second virtual avatars. The first virtual avatar corresponds to an anchor account of the second terminal, and the second virtual avatar corresponds to a target account of the third terminal. After acquiring the second action segment data, the server may generate a second action segment based on the second action segment data, wherein the second action segment is intended to indicate that the first virtual avatar interacts with the second virtual avatar. Next, a pose of the first virtual avatar is changed based on the second action segment, and the first virtual avatar whose pose is changed is transmitted to the second terminal, the third terminal and the first terminal.

Any one of the first, second and third terminals may display a second action segment of the first virtual avatar based on the live streaming image. The second action segment is intended to indicate that the first virtual avatar interacts with the second virtual avatar.

In the above process, as the second terminal initiates a joint live streaming to the third terminal, the server may correspondingly generate a second action segment in which the first avatar interacts with the second avatar. Thus, not only the joint live streaming image but also the action segment in which virtual avatars corresponding to the anchors interacting with each other may be displayed to the audience, which greatly enriches the interactive methods of video live streaming applications.

Figure 8:
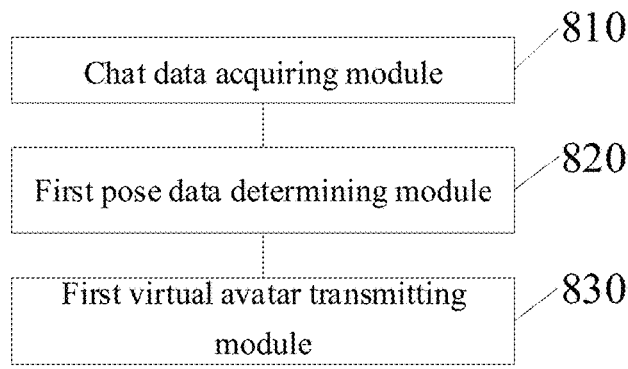
FIG. 8 illustrates a structural block diagram of an apparatus for processing data applicable to a server.

With respect to the embodiment of the method for processing data applicable to the server, an embodiment of the present disclosure further provides an apparatus for processing data applicable to a server. FIG. 8 illustrates a structural block diagram of an apparatus for processing data applicable to a server according to an example embodiment. The apparatus further includes: a chat data acquiring module 810, a first pose data determining module 820, and a first virtual avatar transmitting module 830.

The chat data acquiring module 810 is configured to extract first feature data of the real-time chat data when the real-time chat data transmitted by the first terminal or the second terminal or both is acquired, wherein the real-time chat data includes: text chat data, gesture data, voice chat data, or any combination thereof.

In some embodiments, the chat data acquiring module 810 is configured to acquire an interactive message transmitted based on live streaming data, and extract first feature data of the interactive message.

The first pose data determining module 820 is configured to determine, based on the pre-established corresponding relationship between the feature data and the pose data of the first avatar, the first pose data corresponding to the first feature data.

In some embodiments, the first pose data determining module 820 is configured to determine first pose data based on the first feature data.

The first virtual avatar transmitting module 830 is configured to change the pose of the first virtual avatar based on the first pose data, and transmit the first virtual avatar whose pose is changed based on the first pose data to the first terminal.

In some embodiments, the first virtual avatar transmitting module 830 is configured to determine a pose of a first virtual avatar, and transmit the first virtual avatar based on the first pose data.

The apparatus for processing data according to the embodiment of the present disclosure may be configured to acquire real-time chat data transmitted by a first terminal or a second terminal or both when an anchor is chatting with audience, and extract first feature data of the real-time chat data, and then determine first pose data corresponding to the first feature data based on the pre-established corresponding relationship between the feature data and the pose data of the first virtual avatar, and finally transmit the first virtual avatar whose pose is changed based on the first pose data to the first terminal. Thus, the virtual avatar can also interact with the audience. In this way, interactive methods other than the interaction between the anchor and the audience may be provided, which may prevent the anchor from failing to interact with the audience in a timely manner, thereby avoiding the dissatisfaction from the audience.

In some embodiments, the first avatar transmitting module 830 is further configured to transmit the first virtual avatar whose pose is changed based on the first pose data to the second terminal.

In some embodiments, the apparatus may further include:

a first body posture information acquiring module, configured to extract second feature data in human body posture information when the human body posture information transmitted by the second terminal is acquired; and a first virtual avatar generating module, configured to generate the first virtual avatar corresponding to the human body posture information by superimposing second feature data on a preset human body model.

In other words, the first virtual avatar is determined based on the human body model and the second feature data, and the second feature data includes feature data based on the first human body posture information of a target user.

In some embodiments, the first body posture information acquiring module is configured to acquire the image transmitted by the second terminal, and acquire a facial feature and a human body feature in the image by facial feature recognition and human body feature recognition on the image.

In other words, the second feature data includes a face feature and a human body feature of the target user.

In some embodiments, the apparatus may further include:

a voice recognizing module, configured to acquire voice transmitted by the second terminal, and recognize the voice to obtain a voice feature corresponding to the voice; and a preset human body model establishing module, configured to search for model limbs corresponding to the voice feature in a pre-established human body model limb library, and assemble the model limbs to obtain a preset human body model.

In other words, the human body model is determined based on the model limbs, and the model limbs are obtained by being searched from a human body model limb library based on the voice feature, wherein the voice feature is intended to indicate an acoustic feature of a limb selection voice command input by the target user.

In some embodiments, the first avatar generating module is configured to generate the first virtual avatar corresponding to the facial feature and the human body feature by superimposing the facial feature and the human body feature on the preset human body model.

In some embodiments, the apparatus may further include:

an operation acquiring module, configured to acquire the avatar change operation information transmitted by the second terminal, and acquire the first virtual avatar by changing the generated first virtual avatar corresponding to the human body posture information.

In other words, the operation acquiring module is configured to acquire avatar change operation information, and change the first virtual avatar based on the avatar change operation information.

In some embodiments, the parameters of the first virtual avatar whose avatar is changed change over time. In other words, the dimension parameters of the first virtual avatar change over time.

In some embodiments, the apparatus may further include:

a second avatar generating module, configured to acquire history data in the second terminal, and generate a first virtual avatar based on the history data, wherein the history data at least include: history virtual avatar data or history chat data or both.

In other words, the first virtual avatar is generated based on history data which at least include at least one of history virtual avatar data or history interactive messages.

In some embodiments, the apparatus may further include:

a second pose data determining module, configured to determine, based on the pre-established corresponding relationship between the item information and the pose data of the first virtual avatar, a second pose data corresponding to the first item information, when the first item information transmitted by the first terminal is acquired; and a second virtual avatar transmitting module, configured to change the pose of the first virtual avatar based on the second pose data, and transmit the first virtual avatar whose pose is changed based on the second pose data to the first terminal.

In other words, the interactive message includes a gift message of a virtual item, and the first pose data determining module 820 is configured to determine the first pose data based on the virtual item in response to the interactive message being the gift message of the virtual item.

In some embodiments, the apparatus may further include: a second body posture information acquiring module, an action data determining module, and a third virtual avatar transmitting module.

The second body posture information acquiring module is configured to acquire a video frame transmitted by a second terminal, and recognize a second human body posture information in the video frame.

In some embodiments, the second body posture information acquiring module is configured to recognize the second body posture information of the target user based on the live streaming data.

The action data determining module is configured to determine, based on the pre-established corresponding relationship between the human body posture information and the action data of the first virtual avatar, first action data corresponding to the second human body posture information.

In some embodiments, the action data determining module is configured to determine, based on the second human body posture information, the first action data corresponding to the second human body posture information.

The third virtual avatar transmitting module is configured to change a pose of a first virtual avatar based on the first action data, and transmit the first virtual avatar whose pose is changed based on the first action data to the first terminal.

In some embodiments, the third virtual avatar transmitting module is configured to change a pose of a first virtual avatar based on the first action data.

In some embodiments, the third avatar transmitting module is configured to superimpose the first virtual avatar whose pose is changed based on the first action data on a video frame, and transmit to the first terminal.

In some embodiments, the third virtual avatar transmitting module is configured to add a first virtual avatar whose pose is changed based on the first action data on the live streaming data, and transmit the live streaming data.

In some embodiments, the third virtual avatar transmitting module is configured to transmit the first virtual avatar whose pose is changed based on the first action data to the second terminal.

In some embodiments, the apparatus may further include: a first voice command acquiring module, an action data determining module, and a fourth virtual avatar transmitting module.

The first voice command acquisition module is configured to acquire a video segment and a first voice command transmitted by a second terminal.

In other words, the first voice command acquiring module is configured to acquire the first voice command from the live streaming data.

The first action segment data determining module is configured to determine, based on the pre-established corresponding relationship between the voice command and the action segment data, first action segment data corresponding to the first voice command.

In other words, the first action segment data determining module is configured to determine first action segment data based on the first voice command, wherein the first action segment data corresponds to the first voice command.

The fourth virtual avatar transmitting module is configured to generate an action segment of the first virtual avatar based on the first action segment data, and transmit the action segment of the first virtual avatar and video segment to the first terminal.

In other words, the fourth virtual avatar transmitting module is configured to generate a first action segment based on the first action segment data, and change a pose of the first virtual avatar based on the first action segment.

In some embodiments, the fourth virtual avatar transmitting module is further configured to transmit the action segment of the first virtual avatar and video segment to the second terminal.

In some embodiments, the plurality of terminals further include a third terminal, and the apparatus may further include:

a second voice command acquiring module, configured to determine, based on the identification information of the third terminal, a second virtual avatar corresponding to the third terminal and a plurality of action segment data of the second virtual avatar, in response to the second voice command transmitted by the third terminal;

a second action segment data determining module, configured to determine second action segment data corresponding to the second voice command; and a fifth virtual avatar transmitting module, configured to generate an action segment of the second virtual avatar based on the second action segment data, and transmit the action segment of the second virtual avatar and video segment transmitted by the second terminal to the first terminal.

In some embodiments, the second voice command acquiring module is configured to receive the second voice command in the live streaming data, and determine a target account number based on the second voice command;

The second action segment data determining module is configured to acquire second action segment data, wherein the second action segment data corresponds to the first virtual avatar and the second virtual avatar, and the second virtual avatar corresponds to the target account;

The fifth virtual avatar transmitting module is configured to generate a second action segment based on the second action segment data, wherein the second action segment is intended to indicate that the first virtual avatar interacts with the second virtual avatar, and change a pose of the first avatar based on the second action segment.

In some embodiments, the fifth virtual avatar transmitting module is further configured to transmit the action segment of the second virtual avatar and the video segment transmitted by the second terminal to the second terminal or the third terminal or both.

Figure 9:
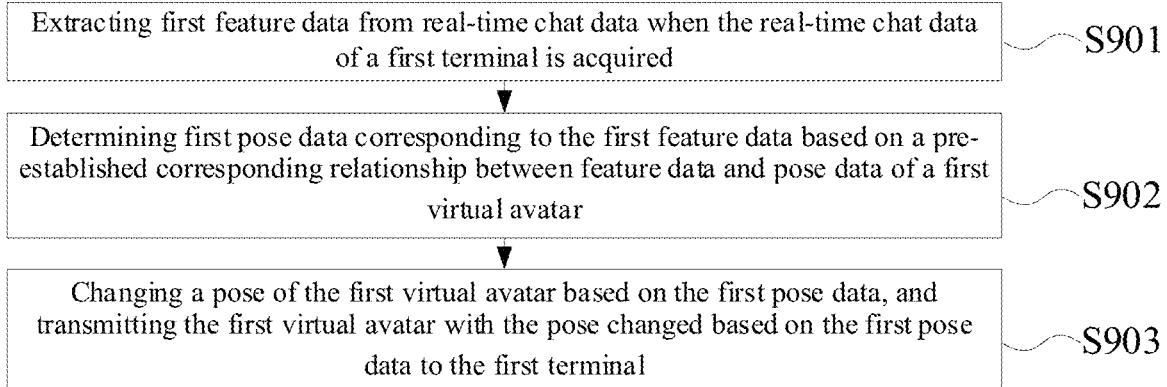
FIG. 9 illustrates a flowchart of a method for processing data applicable to a second terminal according to an example embodiment.

A method for processing data according to an embodiment of the present disclosure may be applicable not only to a server, but also to a second terminal which may be a terminal used by an anchor. The second terminal may be connected in a communication manner to a plurality of first terminals, and the first terminal may be a terminal used by the audience. In this regard, an embodiment of the present disclosure further provides a method for processing data which may be applicable to the second terminal. FIG. 9 illustrates a flowchart of a method for processing data applicable to the second terminal according to an example embodiment. The method may include the following steps.

In S901, first feature data is extracted from real-time chat data when the real-time chat data of a first terminal is acquired, wherein the real-time chat data includes: text chat data, gesture data, or voice chat data, or any combination thereof.

In some embodiments, the second terminal may transmit a request for creating a room to the server in order to establish a virtual room in the server. Then, the first terminal may enable to add a virtual identity of the user using the first terminal to the virtual room by establishing a communication with the server. For example, the virtual room is a live streaming room of the anchor. After the virtual identity of the user of the first terminal is added to the virtual room, the first terminal may transmit chat data to the room, and the second terminal may also transmit chat data to the virtual room, such that the user of the second terminal may chat in real time with the user of the first terminal, and the generated real-time chat data may be recorded in the second terminal or the server. Therefore, the second terminal may acquire the real-time chat data of the first terminal. The real-time chat data may be chat data input by an anchor of the second terminal, or chat data transmitted by the first terminal.

In some embodiments, the user of the second terminal may be an anchor, and the user of the first terminal may be an audience who watches the live streaming video of the anchor.

After acquiring the real-time chat data, the second terminal may analyze the real-time chat data and analyze feature data of the real-time chat data in order to enable automatic interaction with the audience. The feature data may be a keyword or keywords or both.

In some embodiments, a keyword library or a keywords library or both may be pre-stored in a second terminal. When the real-time chat data is text chat data, the second terminal may analyze the real-time chat data at first, and then search for a keyword or keywords or both corresponding to each word in the real-time chat data in the pre-established keyword library or keywords library or both. Thus, the feature data of the real-time chat data may be obtained.

When the real-time chat data is voice chat data, the voice chat data may be converted into text chat data at first, and then a pre-established keyword library or keywords library or both may be used to determine feature data corresponding to the voice chat data, that is, the first feature data.

In S902, the first pose data corresponding to the first feature data is determined by the second terminal based on the pre-established corresponding relationship between the feature data and the pose data of the first virtual avatar.

After the first feature data is obtained, the first pose data corresponding to the first feature data may be determined based on the pre-established corresponding relationship between the feature data and the pose data of the first virtual avatar in this step, in order to enable the preset virtual avatar to interact with the audience.

In some embodiments, the first virtual avatar may be a virtual avatar stored in the second terminal, and the virtual avatar may be preset by a staff member.

In S901 to S902, the interactive message being real-time chat data is taken as an example to show that the second terminal acquires the interactive message, extracts the first feature data of the interactive message, and determines an example of the first pose data based on the first feature data. The interactive message is transmitted based on live streaming data which includes initial pose data of the first virtual avatar, and the first pose data corresponds to the first feature data. In some embodiments, the interactive message may also be a gift message of a virtual item, or the interactive message may also be a like message or the similar. The embodiment of the present disclosure does not specifically limit the type of the interactive message.

In S903, the second terminal changes the pose of the first virtual avatar based on the first pose data, and transmits the first virtual avatar whose pose is changed based on the first pose data to the first terminal.

S903 provides an example in which the second terminal determines the pose of the first virtual avatar based on the first pose data, and transmits the first virtual avatar. Optionally, the second terminal transmits the first virtual avatar after data packaging directly to the first terminal, or the second terminal adds the first virtual avatar to the live streaming data currently being pulled by the first terminal, so as to achieve an effect of inserting the first virtual avatar in the live streaming video stream in real time.

After the second terminal determines the first pose data corresponding to the first feature data, the first pose data may be used to change a pose of the pre-established virtual avatar, that is, to change the pose of the first virtual avatar, such that the first virtual avatar whose pose is changed may be obtained. Then, the first virtual avatar whose pose is changed based on the first pose data may be transmitted to the first terminal, so as to enable the virtual avatar to interact with the user of the first terminal based on real-time chat data transmitted by the first terminal.

In some embodiments, in order to enable the user of the second terminal to also watch the first virtual avatar whose pose is changed based on the first pose data for a better interaction with the user of the first terminal based on the first virtual avatar whose pose is changed, the second terminal not only transmits the first virtual avatar whose pose is changed based on the first pose data to the first terminal, but also displays the first virtual avatar whose pose is changed based on the first pose data on the second terminal.

By the method for processing data according to the embodiment of the present disclosure, real-time chat data transmitted by a first terminal is acquired when an anchor is chatting with an audience, and first feature data of the real-time chat data is extracted, then first pose data corresponding to the first feature data is determined based on the corresponding relationship between the pre-established feature data and the pose data of the first virtual avatar, and finally the first virtual avatar whose pose is changed based on the first pose data is transmitted to the first terminal. Thus, the virtual avatar can also interact with the audience. In this way, an interactive method other than the interaction between the anchor and the audience may be provided, which may prevent the anchor from failing to interact with the audience in a timely manner, and thus avoid the dissatisfaction of the audience.

Figure 10:
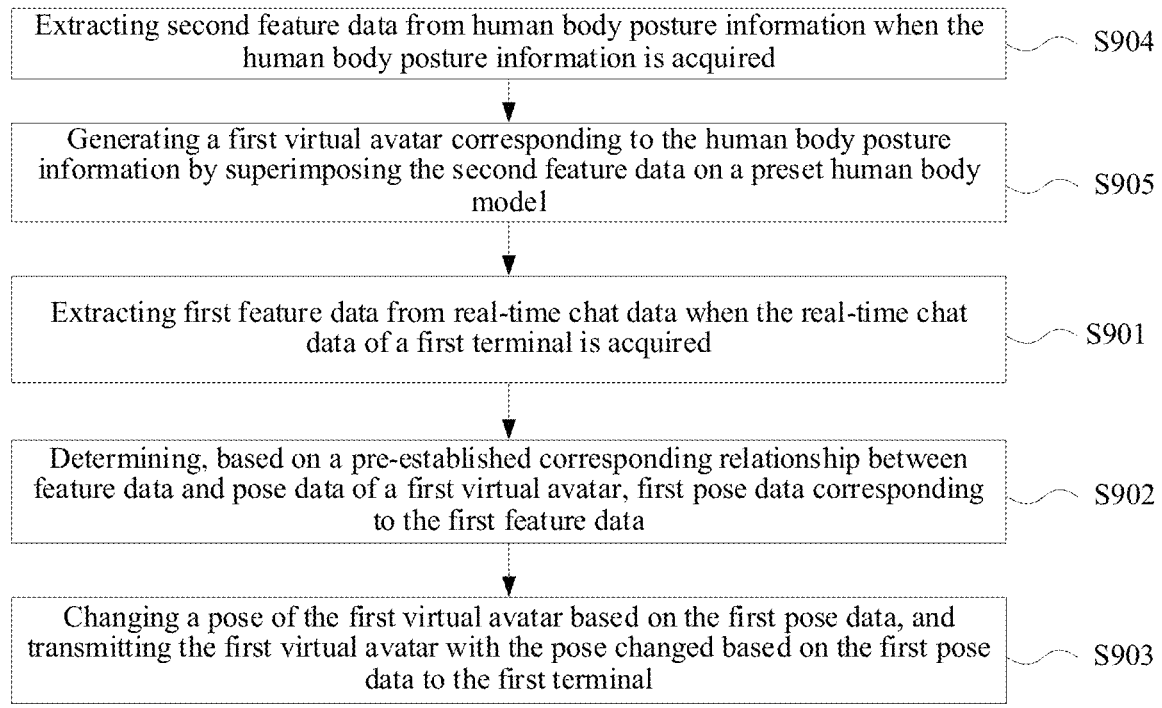
FIG. 10 illustrates a flowchart of a method for processing data applicable to a second terminal according to an example embodiment.

In some embodiments, in addition the fact that the second terminal uses the preset template virtual avatar, the embodiment of the present disclosure further provides an example based on the method for processing data as illustrated in FIG. 9. FIG. 10 illustrates a flowchart of a method for processing data applicable to a second terminal according to an example embodiment. In S901, when the real-time chat data with the first terminal is acquired, before first feature data of the real-time chat data is extracted, the method may further include the following steps.

In S904, second feature data is extracted from the first human body posture information when the second terminal acquires the human body posture information, wherein the first human body posture information is pre-stored in a second terminal or shot by the second terminal.

The second feature data includes feature data based on the first human body posture information of a target user, wherein the target user refers to an anchor.

S904 provides an example in which the second feature data of the first human body posture information is extracted by the second terminal when the first human body posture information of the target user is acquired. Optionally, the second terminal recognizes the first human body posture information from the live streaming data shot by the camera component, and the embodiment of the present disclosure does not specifically limit the acquisition method of the first human body posture information.

In S905, the second terminal generates a first virtual avatar corresponding to the human body posture information by superimposing the second feature data on the preset human body model.

In some embodiments, the anchor may not only use the virtual avatar pre-stored in the second terminal, but also create a virtual avatar in the second terminal based on the avatar thereof. In this regard, the anchor may tap a virtual avatar generation button in the second terminal, and the second terminal may receive a virtual avatar creation instruction. And then, the first human body posture information of the anchor may be acquired, wherein the first human body posture information may include the whole body posture of the anchor, and may further include head posture of the anchor.

After the second terminal acquires the first human body posture information of the anchor, in order to generate the first virtual avatar of the anchor based on the first human body posture information, feature analysis may be performed on the first human body posture information, so as to extract feature data from the first human body posture information, that is, second feature data. For example, when the first human body posture information is the whole body posture, the second terminal may extract the human body key points and head key points of the anchor from the first human body posture information; when the first human body posture information is the head posture, the second terminal may extract the head key points of the anchor from the first human body posture information.

After the second terminal extracts second feature data corresponding to the first human body posture information, a preset human body model may be acquired from the local pre-stored human body model, and a first virtual avatar corresponding to the first human body posture information is generated by superimposing the second feature data on the preset human body model.

In the above process, the second feature data of the first human body posture information is superimposed on the preset human body model, which means that relevant parameters of the preset human body model are adjusted to match with the second feature data of the first human body posture information, such that the first virtual avatar corresponds to the first human body posture information. For example, when the second feature data includes human body key points and head key points, the first virtual avatar corresponding to the first human body posture information may be obtained by replacing the human body key points and the head key points of the preset human body model during the initialization into the human body key points and head key points included in the second feature data. In other words, the first virtual avatar is determined based on the human body model and the second feature data.

In some embodiments, after extracting the second feature data corresponding to the first human body posture information, the second terminal may display a plurality of human models which are pre-stored locally, such that the anchor of the second terminal may select one human model from the plurality of human models. After receiving the human body model selected by the anchor, the second terminal superimposes the second feature on the human body model selected by the anchor, so as to obtain a first virtual avatar corresponding to the first human body posture information of the anchor. For example, the extracted human body key points may be superimposed on the human body key points in the human model to replace the human body key points in the human body model, or the head key points of the anchor may be used to replace the head key points in the human body model, so as to obtain the first virtual avatar corresponding to the first human body posture information of the anchor.

In some embodiments, the first human body posture information may be an image of the second terminal, then the second terminal acquires the face feature and the human body feature in the image by face feature recognition and human body feature recognition on the image, and determine the face feature and the human body feature as the second feature data. In other words, the second feature data includes the face feature and the human body feature of the target user (i.e., the anchor).

In some embodiments, the preset human model may be a human model composed of a plurality of preset model limbs. In one aspect of the present disclosure, the second terminal may be pre-assembled into a human body model based on voice of the anchor.

For example, the anchor may input the voice of the model limbs to be selected to the second terminal, and the second terminal may acquire a voice feature of the voice by voice recognition. Then, the model limbs corresponding to the voice feature are searched for in the pre-established human body model limb library. After the model limbs are obtained, the model limbs may be assembled to obtain the preset human body model; finally, the face feature and the human body feature may be superimposed on the preset human body model to generate a first virtual avatar corresponding to the face feature and human body feature. In other words, the human body model is determined based on the model limbs, and the model limbs are obtained by being searched from a human body model limb library based on the voice feature, wherein the voice feature is intended to indicate an acoustic feature of a limb selection voice command input by the target user.

By means of the embodiment of the present disclosure, the first virtual avatar may be made closer to the avatar of the anchor, such that the interaction between the virtual avatar and the audience is closer to the interaction between the anchor and the audience, and the interest of the audience is increased.

In some embodiments, in order to improve the flexibility of setting the virtual avatar, the anchor of the second terminal may also adjust the generated first virtual avatar after the step of generating and using the first virtual avatar corresponding to the human body information. In this regard, the anchor may tap the virtual avatar adjustment button in the second terminal to adjust the dimension parameters of the first virtual avatar. The dimension parameters of the virtual avatar may include: head height, face width, pupil distance and the similar.

Then, the server may display the dimension parameters of the first virtual avatar, and the anchor of the second terminal may adjust the parameters. After the anchor of the second terminal adjusts, the second terminal may change, based on the adjustment parameters, the generated first virtual avatar corresponding to the human body posture information when the adjustment parameters are acquired, so as to obtain the first virtual avatar whose avatar is changed. That is, the first virtual avatar is adjusted by using the adjustment parameters, such that the first virtual avatar whose avatar is changed may be obtained. In other words, the second terminal acquires avatar change operation information and change the first virtual avatar based on the avatar change operation information.

In some embodiments, in order to enable the first virtual avatar whose avatar is changed to better interact with the audience and increase the interest of the audience, the dimension parameters of the first virtual avatar whose avatar is changed may be changed over time. In other words, the dimension parameters of the first virtual avatar change over time.

For example, with the extension of the time for the anchor to use the second terminal, the dimension parameters of the first virtual avatar whose avatar is changed may become larger or smaller, such that the first virtual avatar whose avatar is changed becomes higher, lower, fatter, or thinner with the extension of time.

In some embodiments, as time changes, the items transmitted by the first terminal may change, the number of first terminals may also change, and the number of audiences who subscribe the second terminal may change accordingly. For example, the audiences of the first terminal may give more gifts to the anchor of the second terminal, and more audiences may use the first terminal to watch the live streaming of the anchor of the second terminal. Therefore, the dimension parameters of the first virtual avatar whose avatar is changed may be changed with the change of item information, also with the change of number of the first terminals, and also with the change of number of audiences who subscribe to the anchor of the second terminal. The embodiment of the present disclosure does not specifically limit the change method of the dimension parameters.

In some embodiments, a method for processing data applicable to a second terminal according to an embodiment of the present disclosure may also adopted to acquire history data in the second terminal, and then generate a first virtual avatar based on the history data, that is, the first virtual avatar is generated based on the history data. The history data include at least one of history virtual avatar data or a history interactive message. For example, the history interactive message includes history chat data, or the history interactive message includes a history gift message of a virtual item.

In some embodiments, when the history data in the second terminal is history virtual avatar data, the virtual avatar commonly used by the anchor corresponding to the second terminal may be obtained by analyzing the history virtual avatar data, and then the first virtual avatar may be generated according to the virtual avatar commonly used by the anchor.

When the history data in the second terminal is history chat data, the interest preference and personality of the anchor corresponding to the second terminal may be obtained by analyzing the history chat data, such that the first virtual avatar corresponding to the interest preference and personality of the anchor may be generated.

In this way, the first virtual avatar may be automatically generated without the operation of an anchor, and the convenience of generating the first virtual avatar is improved.

Figure 11:
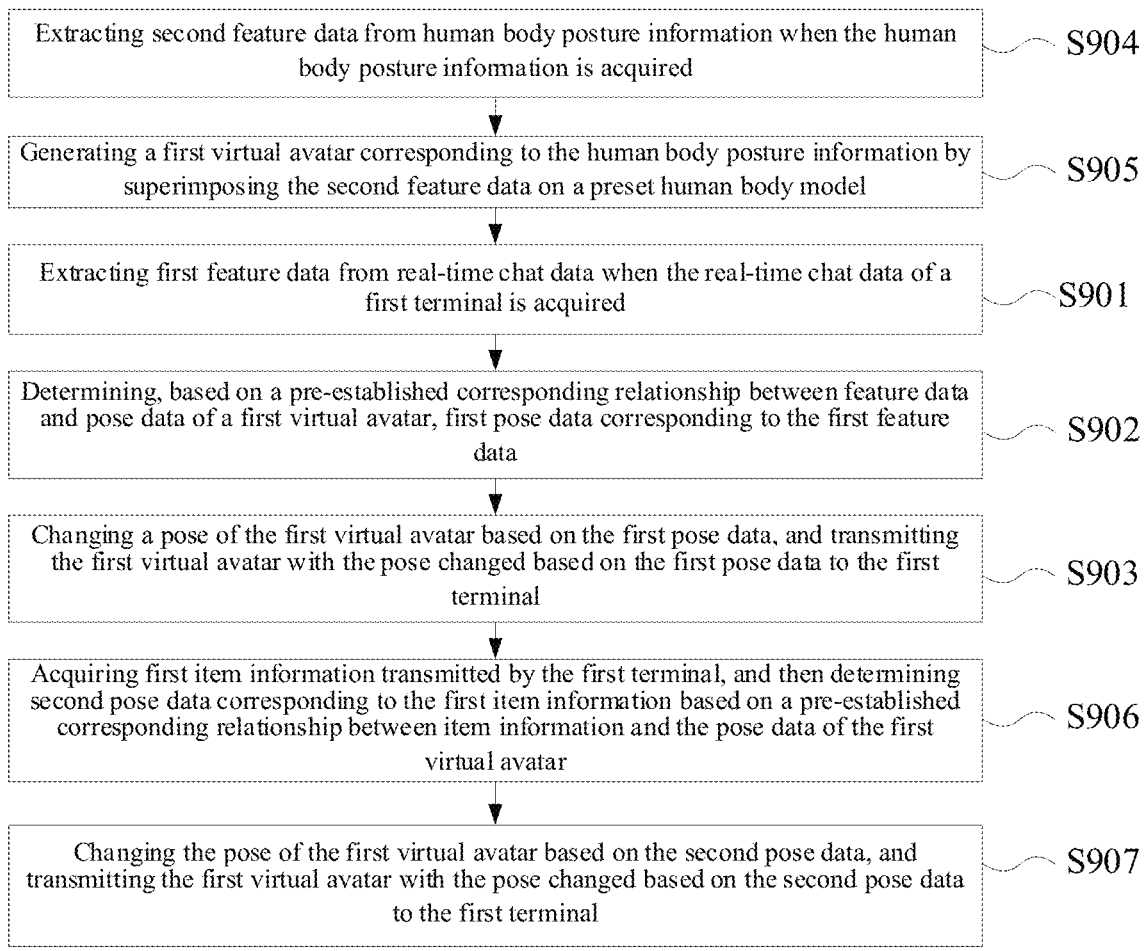
FIG. 11 illustrates a flowchart of a method for processing data applicable to a second terminal according to an example embodiment.

The embodiment of the present disclosure also provides an example based on the method for processing data as illustrated in FIG. 10. FIG. 11 illustrates a flowchart of a method for processing data applicable to a second terminal according to an example embodiment. In S903, a pose of the first virtual avatar is changed based on first pose data, and after the first virtual avatar whose pose is changed based on the first pose data is transmitted to the first terminal, the method further includes the following steps.

In S906, a second pose data corresponding to the first item information is determined by the second terminal based on the pre-established corresponding relationship between the item information and the pose data of the first virtual avatar, after the first item information transmitted by the first terminal is acquired.

The first item information is also a gift message of the virtual item, and the second pose data is also first pose data corresponding to the gift message of the virtual item.

Taking the interactive message being a gift message of a virtual item as an example, S906 provides an example of determining the first pose data according to the virtual item. In other words, the second terminal may not only determine first pose data based on the real-time chat data, but also determine first pose data based on the gift message of the virtual item. Various types of interactive messages transmitted based on live streaming data may trigger the acquisition of the first pose data.

In S907, a second terminal changes a pose of the first virtual avatar based on the second pose data and transmits the first virtual avatar whose pose is changed based on the second pose data to the first terminal.

In some embodiments, during the process in which the audience of the first terminal interacts with the anchor of the second terminal, he or she may give a gift to the anchor. Then, the audience of the first terminal may tap the item in the first terminal and tap to give the gift on the first terminal, to trigger the first terminal to send the first item information (i.e., the gift message of virtual item) to the second terminal via the server. At this moment, the second terminal may receive the first item information (i.e., the gift message of the virtual item) transmitted by the first terminal.

In order to enable the virtual avatar to interact with the audience after the item is given, the corresponding relationship between the virtual item and the pose data of the first virtual image may be pre-established. After receiving the first item information, the second terminal may determine, based on the pre-established corresponding relationship between the virtual item and the pose data, a second pose data corresponding to the first item information. Then, the second pose data may be used to change the pose of the first virtual image. After changing the pose of the first virtual image, the first virtual avatar based on the second pose data may be transmitted to the first terminal. Thus, the interaction between the first virtual avatar and the audience may be corresponding to the virtual item triggered by the first terminal.

Figure 12:
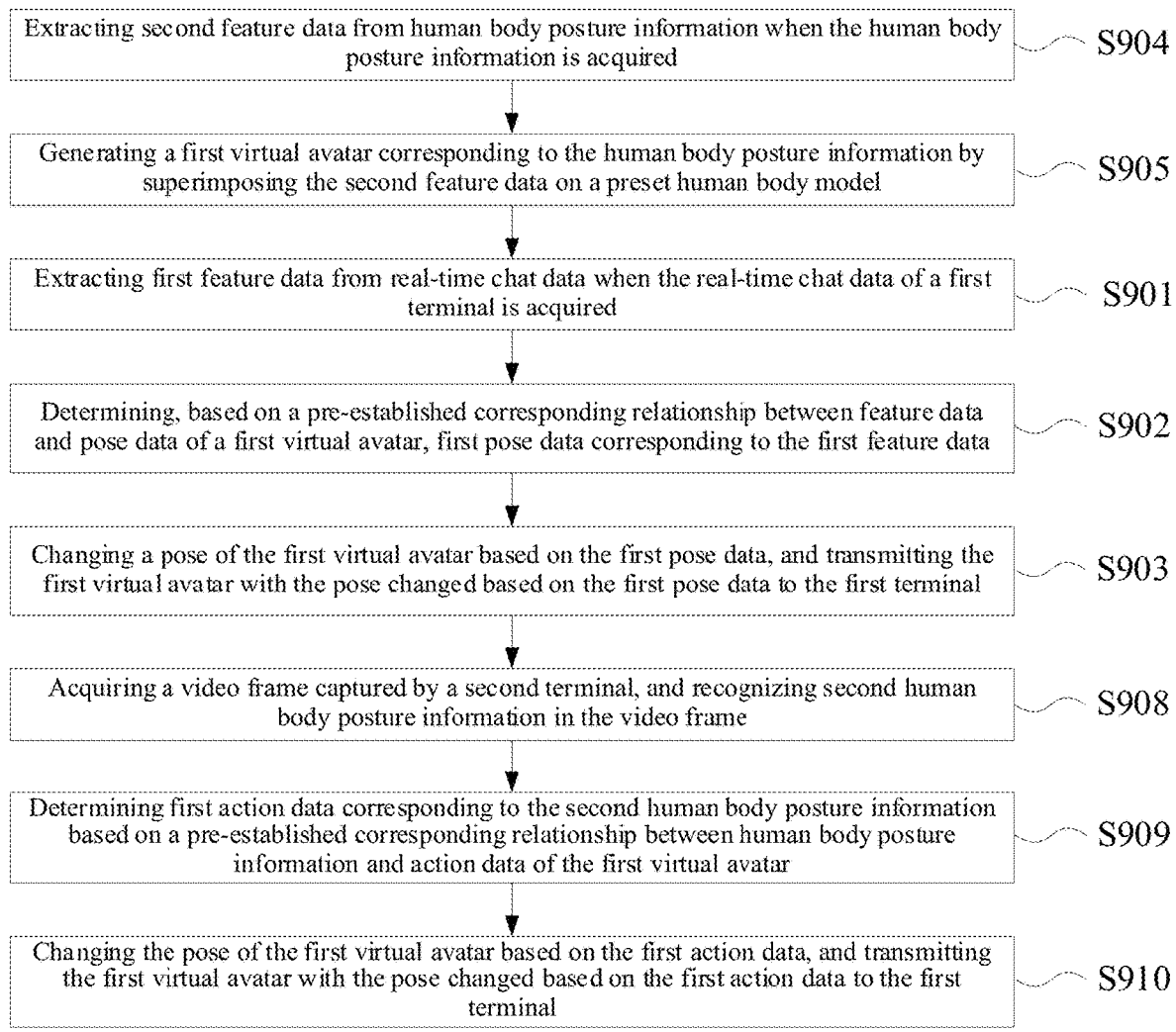
FIG. 12 illustrates a flowchart of a method for processing data applicable to a second terminal according to an example embodiment.

The embodiment of the present disclosure also provides an example based on the method for processing data as illustrated in FIG. 10. FIG. 12 illustrates a flowchart of a method for processing data applicable to a second terminal according to an example embodiment. In S903, a pose of the first virtual avatar is changed based on first pose data, and after the first virtual avatar whose pose is changed based on the first pose data is transmitted to the first terminal, the method further includes the following steps.

In S908, the second terminal acquires the video frame shot by the camera component and recognizes second body posture information in the video frame.

S908 provides an example in which the second terminal recognizes the second human body pose information of the target user based on the live streaming data. The target user refers to the anchor. Since the live streaming data is also the live streaming video stream shot by the second terminal via the camera component, the second terminal may recognize the second human body posture information of the target user in any video frame in the live streaming video stream in real time.

In S909, the second terminal determines, based on the pre-established corresponding relationship between the human body posture information and the action data of the first virtual avatar, first action data corresponding to second human body posture information.

In other words, the second terminal determines, based on the second human body posture information, the first action data corresponding to the second human body posture information.

In S910, the second terminal changes the pose of the first virtual avatar based on the first action data, and transmits the first virtual avatar whose pose is changed based on the first action data to the first terminal.

In some embodiments, the second terminal changes the pose of the first virtual avatar based on the first action data, and transmits the first virtual avatar whose pose is changed to the first terminal.

In some embodiments, the virtual avatar is enabled to not only interact with the audience of the first terminal, but also interact with the anchor of the second terminal, and the audience of the first terminal are enabled to watch the process of the interaction between the first virtual avatar and the anchor of the second terminal. In this regard, the second terminal may acquire a video frame shot by itself, wherein the video frame of the second terminal may be shot by the anchor of the second terminal using the camera of the second terminal.

After obtaining the video frame, the second terminal may recognize the video frame to recognize the second human body posture information from the video frame. In some embodiments, the second terminal may recognize the human body key points in the video frame, and take the human body key points in the video frame as the second human body posture information. Alternatively, head key points in the video frame are recognized, and served as the second human body posture information.

In some embodiments, in order to make the pose of the second virtual avatar correspond to the human body posture of the anchor when the second virtual avatar interacts with the anchor, the corresponding relationship between human body posture information and the action data of the first virtual avatar may be pre-established. Then, the second terminal may determine, based on the pre-established corresponding relationship between the human body posture information and the action data of the first virtual avatar, first action data corresponding to second human body posture information.

After determining the first action data corresponding to the second human body posture information, the second terminal may change a pose of the first virtual avatar based on the first action data, and transmit the first virtual avatar whose pose is changed based on the first action data to the first terminal. In this way, the audience using the first terminal is enabled to watch the interactive process between an anchor using the second terminal and the first virtual avatar, thereby increasing the interest of the audience in watching and enhancing the watching experience of the audience.

In some embodiments, when the first virtual avatar whose pose is changed based on the first action data is transmitted to the first terminal, the first virtual avatar whose pose is changed based on the first action data is superimposed on the video frame and then transmitted to the first terminal. In other words, the second terminal adds the first virtual avatar whose pose is changed based on the first action data to the live streaming data, and transmits the live streaming data, which can reduce the times of communication between the terminals and reduce the communication overhead.

In some embodiments, the first action data may be position data or distance data between key points of the first virtual avatar.

In some embodiments, in order to enable the anchor using the second terminal to watch the process of interaction between the anchor and the virtual avatar, the second terminal may also display the first virtual avatar whose pose is changed based on the first action data on the second terminal.

Figure 13:
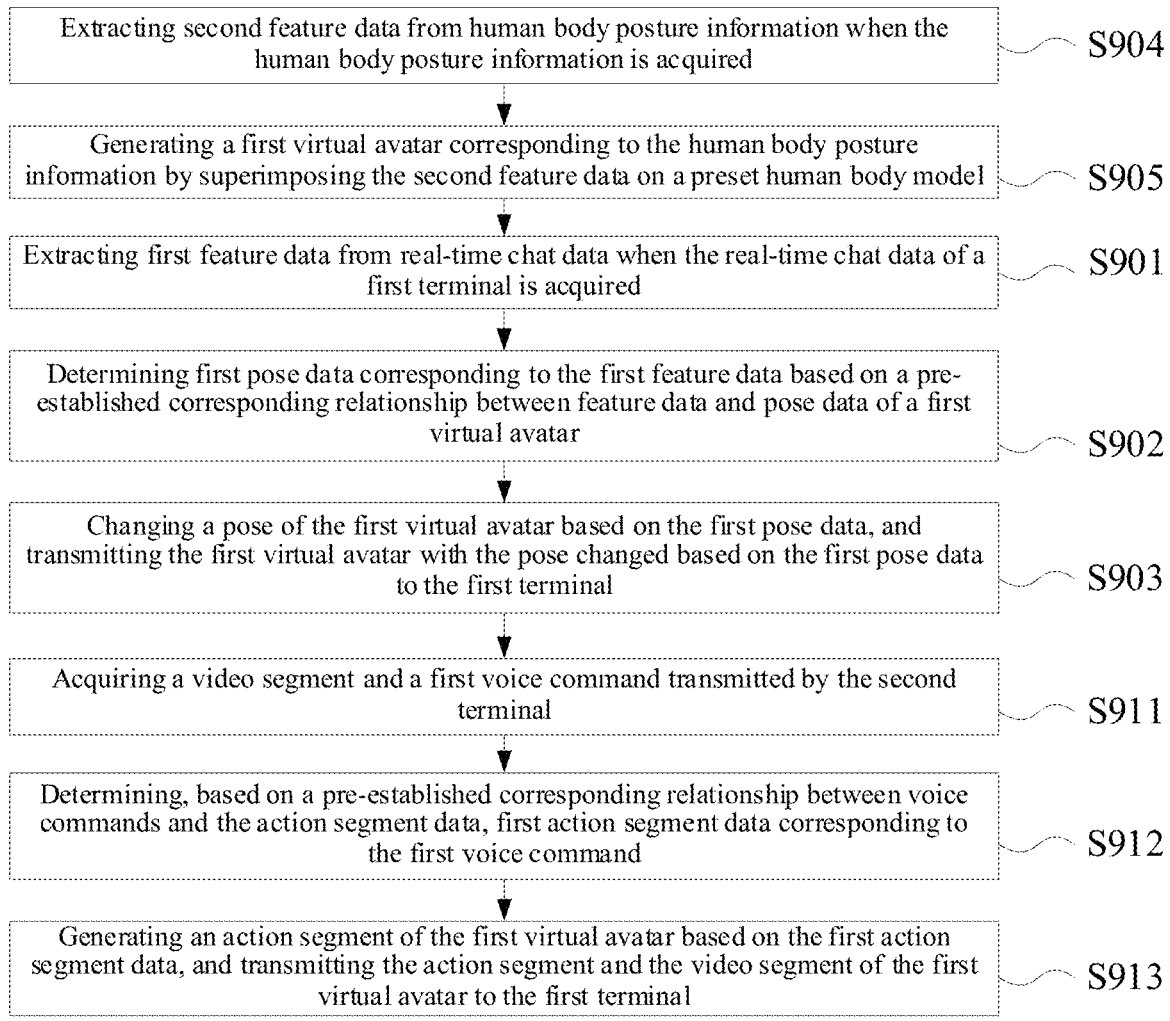
FIG. 13 illustrates a flowchart of a method for processing data applicable to a second terminal according to an example embodiment.

In some embodiments, the first virtual avatar interacts with the anchor based on the human body information of the anchor. In order to enable the first virtual avatar to interact with the anchor based on the voice information of the anchor using the second terminal, the embodiment of the present disclosure also provides an example based on the method for processing data as illustrated in FIG. 10. In FIG. 13, a flowchart of a method for processing data applicable to a second terminal according to an example embodiment is illustrated as an example In S903, a pose of the first virtual avatar is changed based on first pose data, and after the first virtual avatar whose pose is changed based on the first pose data is transmitted to the first terminal, the method further includes the following steps.

In S911, the second terminal acquires video segment and first voice command.

S911 provides an example in which the second terminal acquires the first voice command in the live streaming data. In the embodiment of the present disclosure, the live streaming data being a video segment is illustrated as an example.

In S912, the second terminal determines, based on the pre-established corresponding relationship between the voice command and the action segment data, the first action segment data corresponding to the first voice command.

In other words, the second terminal determines first action segment data based on the first voice command, wherein the first action segment data corresponds to the first voice command.

In S913, the second terminal generates the first action segment of the first virtual avatar based on the first action segment data, and transmits the first action segment of the first virtual avatar and the video segment to the first terminal.

In other words, the second terminal generates a first action segment based on the first action segment data, and changes a pose of the first virtual avatar based on the first action segment.

In some embodiments, in order to enable the first virtual avatar to interact with the anchor based on the voice command of the anchor, the voice command and the action segment data corresponding to the voice command may be pre-stored in the second terminal.

The anchor may use the second terminal to collect a voice command and a video segment, and determine, based on the pre-established corresponding relationship between the voice command and the action segment data, first action segment data corresponding to the first voice command. Then, the first action segment of the first virtual avatar may be generated based on the first action segment data. Finally, the first action segment of the first virtual avatar and the video segment may be transmitted to the first terminal.

In some embodiments, the first action segment data may be positions of or distances between key points of the first virtual avatar corresponding to different moments.

In some embodiments, in order to enable the anchor using the second terminal to watch the process of interaction between the first virtual avatar and the anchor, the second terminal may also display the action segment of the first virtual avatar and the video segment on the second terminal.

Figure 14:
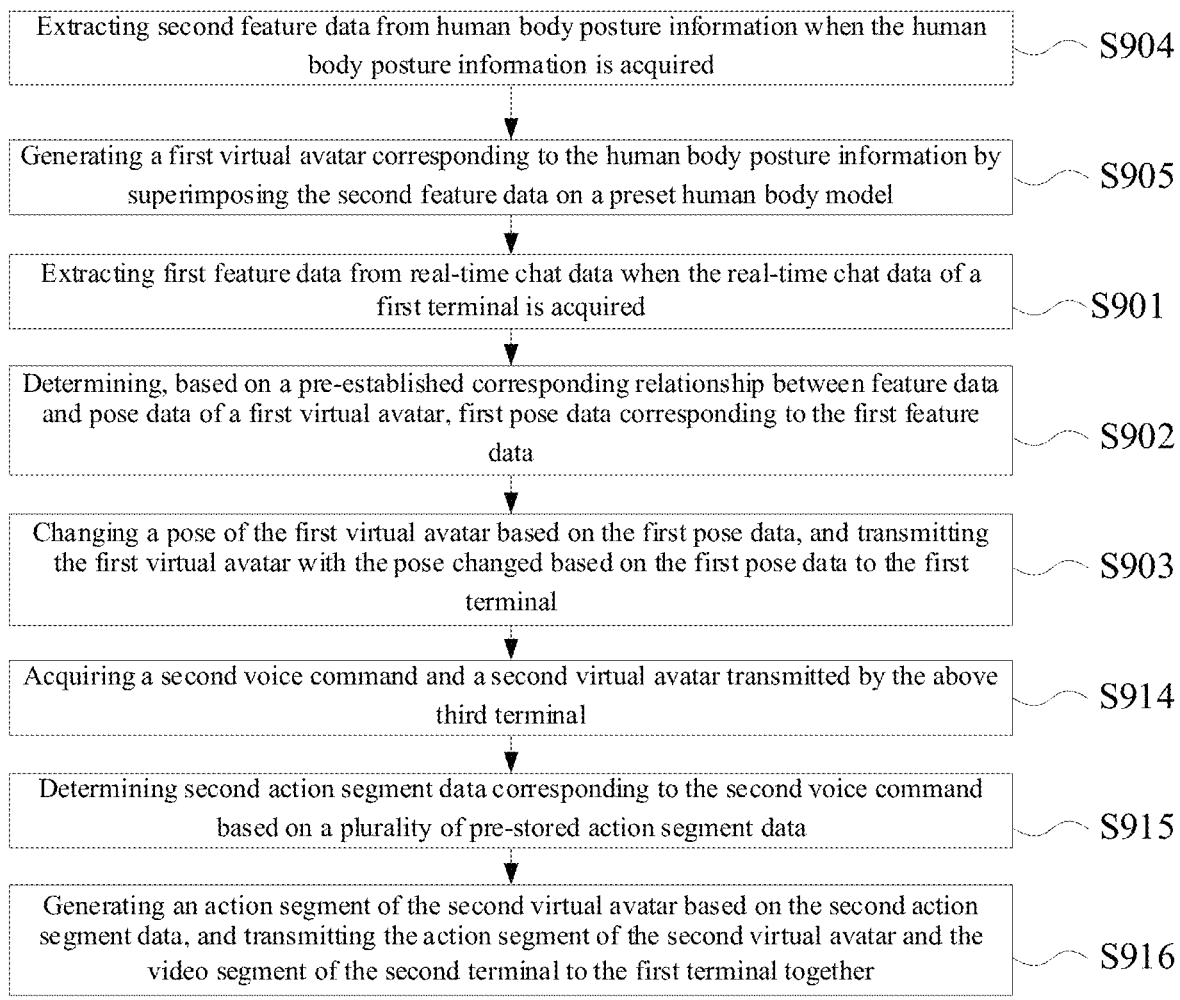
FIG. 14 illustrates a flowchart of a method for processing data applicable to a second terminal according to an example embodiment.

In some embodiments, in order to increase the interest of the audience, an anchor of the second terminal may also interact with a virtual avatar of another anchor, in addition to a first virtual avatar and audience of a first terminal. In this regard, the second terminal may also be connected in a communication manner with a third terminal which may be a terminal used by any one of other anchors. In this regard, the embodiment of the present disclosure also provides an example based on the method for processing data as illustrated in FIG. 10. FIG. 14 illustrate a flowchart of a method for processing data applicable to the second terminal according to an example embodiment. The method further includes the following steps.

In S914, the second terminal acquires the second voice command and the second virtual avatar transmitted by the third terminal, wherein the second voice command is the voice command collected by the second terminal.

In S915, the second terminal determines, based on the plurality of pre-stored action segment data, second action segment data corresponding to the second voice command.

In S916, the second terminal generates a second action segment of the second virtual avatar based on the second action segment data, and transmits the second action segment of the second virtual avatar and the video segment of the second terminal to the first terminal.

In some embodiments, before the anchor of the second terminal interacts with the virtual avatar of another anchor who may use his or her own terminal to interact with the anchor of the second terminal. For example, the third terminal may be used to transmit a second virtual avatar to the second terminal. Therefore, the second terminal may receive the second virtual avatar transmitted by the third terminal.

After receiving the second virtual avatar transmitted by the third terminal, the second terminal may determine, based on the plurality of pre-stored action segment data, second action segment data corresponding to the second voice command, in order to determine the virtual avatar corresponding to the anchor using the third terminal. A plurality of action segment data may be stored in the second terminal.

After determining the second action segment, the second terminal may generate the action segment of the second virtual avatar based on the second action segment data, and transmit the action segment data of the second virtual avatar and the video segment of the second terminal to the first terminal, such that the audience of the first terminal may watch the process of interaction between an anchor of the second terminal and a second virtual avatar corresponding to the third terminal, so as to increase the watching interest of the audience. Interactive methods between the anchor the audience are increased.

In some embodiments, the second action segment data may be positions of or distances between key points of the second virtual avatar corresponding to different moments.

In some embodiments, it is also possible that the second virtual avatar may be superimposed on the video segment transmitted by the second terminal and transmitted to the first terminal by the server.

In some embodiments, after the action segment of the second virtual avatar and the video segment transmitted by the second terminal are transmitted to the first terminal, the action segment of the second virtual avatar and the video segment of the second terminal may also be transmitted to the third terminal or the second terminal or both by the above second terminal, such that the anchor of the second terminal or the anchor of the third terminal or both may watch the process of interaction between the anchor of the second terminal and the second virtual avatar.

In the above process, the joint live streaming initiated by the third terminal to the second terminal is illustrated as an example. In some embodiments, if the second terminal serves as an initiator of the joint live streaming, the second terminal may acquire the second voice command in the live streaming data, and determine, based on the second voice command, a target account indicated by the second voice command, under an assumption that a terminal device corresponding to the target account is a third terminal.

In some embodiments, the second voice command is a voice command for joint live streaming with the target account, and at this moment the second terminal may determine the target account based on smart voice recognition. Next, the second terminal acquires second action segment data corresponding to the first virtual avatar and the second virtual avatar. The first virtual avatar corresponds to an anchor account of the second terminal, and the second virtual avatar corresponds to a target account of the third terminal. After acquiring the second action segment data, the second terminal may generate a second action segment based on the second action segment data, wherein the second action segment is intended to indicate that the first virtual avatar interacts with the second virtual avatar. Next, a pose of the first virtual avatar is changed based on the second action segment, and the first virtual avatar whose pose is changed is transmitted to the third terminal and the first terminal.

In the above process, as the second terminal initiates a joint live streaming to the third terminal, the second terminal may correspondingly generate a second action segment in which the first avatar interacts with the second avatar. Thus, the joint live streaming image is presented to the audience, but also the action segment in which virtual avatars corresponding to the anchors interact with each other is presented to the audience, which greatly enriches the interactive methods of video live streaming applications.

Figure 15:
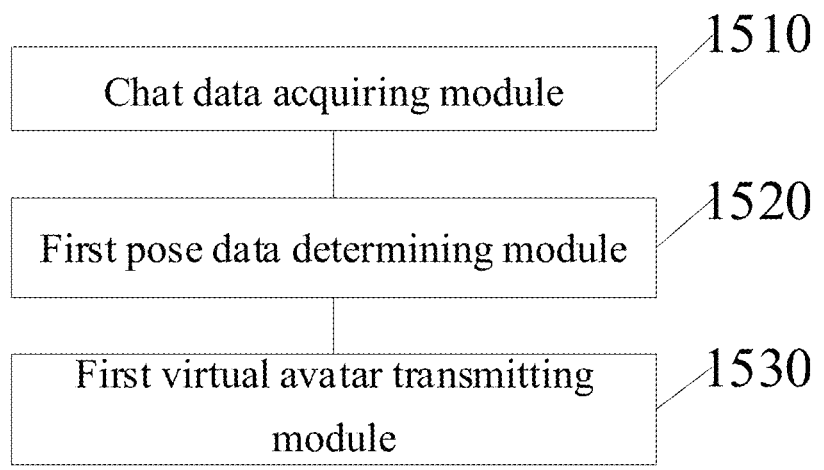
FIG. 15 illustrates a block diagram of an apparatus for processing data applicable to a second terminal.

With respect to the embodiment of the method for processing data applicable to the second terminal, an embodiment of the present disclosure also provides an apparatus for processing data applicable to a second terminal. FIG. 15 illustrates an example block diagram of an apparatus for processing data applicable to a second terminal. The apparatus may include: a chat data acquiring module 1510, a first pose data determining module 1520, and a first virtual avatar transmitting module 1530.

The chat data acquiring module 1510 is configured to extract first feature data of the real-time chat data when the real-time chat data of the first terminal is acquired, wherein the real-time chat data includes: text chat data, gesture data, or voice chat data, or any combination thereof.

In some embodiments, the chat data acquiring module 1510 is configured to acquire an interactive message transmitted based on live streaming data, and extract first feature data of the interactive message.

The first pose data determining module 1520 is configured to determine, based on the pre-established corresponding relationship between the feature data and the pose data of the first avatar, the first pose data corresponding to the first feature data.

In some embodiments, the first pose data determining module 1520 is configured to determine first pose data based on the first feature data.

The first virtual avatar transmitting module 1530 is configured to change the pose of the first virtual avatar based on the first pose data, and transmit the first virtual avatar whose pose is changed based on the first pose data to the first terminal.

In some embodiments, the first virtual avatar transmitting module 1530 is configured to determine a pose of a first virtual avatar, and transmit the first virtual avatar based on the first pose data.

The apparatus for processing data according to the embodiment of the present disclosure may be configured to acquire the real-time chat data of a first terminal when an anchor is chatting with the audience, and extract first feature data of the real-time chat data, and then determine, based on the corresponding relationship between the pre-established feature data and the pose data of the first virtual avatar, first pose data corresponding to the first feature data, and finally transmit the first virtual avatar whose pose is changed based on the first pose data to the first terminal. Thus, the virtual avatar can also interact with the audience. In this way, interactive methods other than the interaction between the anchor and the audience may be provided, which may prevent the anchor from failing to interact with the audience in a timely manner, thereby avoiding the dissatisfaction from the audience.

In some embodiments, the apparatus may further include:

a first displaying module, configured to display a first virtual avatar whose pose is changed based on the first pose data at the second terminal.

In some embodiments, the first displaying module is configured to: display a live streaming image based on live streaming data, and the live streaming image including a first virtual avatar; receive the first pose data of the first virtual avatar, the first pose data being triggered by an interactive message; and display the first virtual avatar based on the first pose data in the live streaming image.

In some embodiments, the apparatus may further include:

a first body posture information acquiring module, configured to extract second feature data from the human body posture information when the human body posture information is acquired, wherein the human body posture information is pre-stored in the second terminal or shot by the second terminal; and a first virtual avatar generating module, configured to generate the first virtual avatar corresponding to the human body posture information by superimposing second feature data on a preset human body model.

In other words, the first virtual avatar is determined based on the human body model and the second feature data, and the second feature data includes feature data based on the first human body posture information of a target user.

In some embodiments, the first body posture information acquiring module is configured to acquire the image of the second terminal, and acquire a facial feature and a human body feature in the image by facial feature recognition and human body feature recognition on the image.

In other words, the second feature data includes a face feature and a human body feature of the target user.

In some embodiments, the apparatus may further include:
a voice recognizing module, configured to acquire a voice transmitted by the second terminal, and acquire a voice feature corresponding to the voice by recognizing the voice; and
a preset human body model establishing module, configured to search for model limbs corresponding to the voice feature in a pre-established human body model limb library, and acquire a preset human body model by combining the model limbs.

In other words, the human body model is determined based on the model limbs, and the model limbs are obtained by being searched from a human body model limb library based on the voice feature, wherein the voice feature is intended to indicate an acoustic feature of a limb selection voice command input by the target user.

In some embodiments, the first avatar generating module is configured to generate the first virtual avatar corresponding to the facial feature and the human body feature by superimposing the facial feature and the human body feature on the preset human body model.

In some embodiments, the apparatus may further include:
an operation acquiring module, configured to acquire the avatar change operation information, and acquire the first virtual avatar with a changed avatar by changing the first virtual avatar base on the avatar change operation information.

In other words, the operation acquiring module is configured to acquire avatar change operation information, and change the first virtual avatar based on the avatar change operation information.

In some embodiments, the dimension parameters of the first virtual avatar after the avatar is changed change over time. In other words, the dimension parameters of the first virtual avatar change over time.

In some embodiments, the apparatus may further include:
a second avatar generating module, configured to acquire history data in the second terminal, and generate a first virtual avatar based on the history data, wherein the history data at least includes: history virtual avatar data or history chat data or both.

In other words, the first virtual avatar is generated based on history data which at least includes at least one of history virtual avatar data or history interactive messages.

In some embodiments, the apparatus may further include:
a second pose data determining module, configured to determine, based on the pre-established corresponding relationship between the item information and the pose data of the first virtual avatar, a second pose data corresponding to the first item information, when the first item information transmitted by the first terminal is acquired; and a second virtual avatar transmitting module, configured to change the pose of the first virtual avatar based on the second pose data, and transmit the first virtual avatar whose pose is changed based on the second pose data to the first terminal.

In other words, the interactive message includes a gift message of a virtual item, and the first pose data determining module 1520 is configured to determine the first pose data based on the virtual item in response to the interactive message being the gift message of the virtual item.

In some embodiments, the apparatus may further include:
a second body posture information acquiring module, an action data determining module, and a third virtual avatar transmitting module.

The second body posture information acquiring module is configured to acquire a video frame shot by a second terminal, and recognize a second human body posture information in the video frame.

In some embodiments, the second body posture information acquiring module recognizes the second body posture information of the target user based on the live streaming data.

The action data determining module is configured to determine, based on the pre-established corresponding relationship between the human body posture information and the action data of the first virtual avatar, first action data corresponding to the second human body posture information.

In some embodiments, the action data determining module is configured to determine, based on the second human body posture information, the first action data corresponding to the second human body posture information.

The third virtual avatar transmitting module is configured to change a pose of a first virtual avatar based on the first action data, and transmit the first virtual avatar whose pose is changed based on the first action data to the first terminal.

In some embodiments, the third virtual avatar transmitting module is configured change a pose of a first virtual avatar based on the first action data.

In some embodiments, the third avatar transmitting module is configured to superimpose the first virtual avatar whose pose is changed based on the first action data on a video frame, and transmit the same to the first terminal.

In some embodiments, the third virtual avatar transmitting module is configured to add a first virtual avatar whose pose is changed based on the first action data on the live streaming data, and transmit the live streaming data.

In some embodiments, the apparatus may further include:
a second display module, configured to display a first virtual avatar whose pose is changed based on the first action data at the second terminal.

In some embodiments, the second display module is configured to display first action segment of the first virtual avatar based on the live streaming image, wherein the first action segment is triggered by a first voice command.

In some embodiments, the apparatus may further include:
a first voice command acquiring module, an action data determining module, and a fourth virtual avatar transmitting module.

The first voice command acquiring module is configured to acquire a video segment and a first voice command of a second terminal.

In other words, the first voice command acquiring module is configured to acquire the first voice command from the live streaming data.

The action data determining module is configured to determine, based on the pre-established corresponding relationship between the voice command and the action segment data, first action segment data corresponding to the first voice command.

In other words, the first action segment data determining module is configured to determine first action segment data based on the first voice command, wherein the first action segment data corresponds to the first voice command.

The fourth virtual avatar transmitting module is configured to generate an action segment of the first virtual avatar based on the first action segment data, and transmit the action segment of the first virtual avatar and video segment to the first terminal.

In other words, the fourth virtual avatar transmitting module is configured to generate a first action segment based on the first action segment data, and change a pose of the first virtual avatar based on the first action segment.

In some embodiments, the apparatus may further include:

a third displaying module, configured to display an action segment of a first virtual avatar and a video segment in the second terminal.

In some embodiments, the third displaying module is configured to display a second action segment of the first virtual avatar based on the live streaming image, wherein the second action segment is intended to indicate that the first virtual avatar interacts with the second virtual avatar.

In some embodiments, a second terminal is also connected in a communication manner to a third terminal; and the apparatus may further include:

a second voice command acquiring module, configured to acquire the second voice command and the second virtual avatar transmitted by the third terminal, wherein the second voice command is the voice command collected by the second terminal;

a second action data determining module, configured to determine, based on the plurality of pre-stored action segment data, second action data corresponding to the second voice command; and a fifth virtual avatar transmitting module, configured to generate an action segment of the second virtual avatar based on the second action segment data, and transmit the action segment of the second virtual avatar and video segment of the second terminal to the first terminal.

In some embodiments, the second voice command acquiring module is configured to receive the second voice command in the live streaming data, and transmit a target account number based on the second voice command;

the second action segment data determining module is configured to acquire second action segment data, wherein the second action segment data corresponds to the first virtual avatar and the second virtual avatar, and the second virtual avatar corresponds to the target account; and the fifth virtual avatar transmitting module is configured to generate a second action segment based on the second action segment data, wherein the second action segment is intended to indicate that the first virtual avatar interacts with the second virtual avatar, and changing a pose of the first avatar based on the second action segment.

In some embodiments, the apparatus may further include:

a fourth displaying module, configured to transmit action segment of the second virtual avatar and video segment of the second terminal to the third terminal, or display the action segment of the second virtual avatar at the second terminal, or both transmit the action segment and display the action segment.

With respect to the apparatus in the embodiments above, the specific way of performing the operations by the respective modules has been described in detail in the embodiments related to this method, and a detailed description thereof is not given here.

Figure 16:
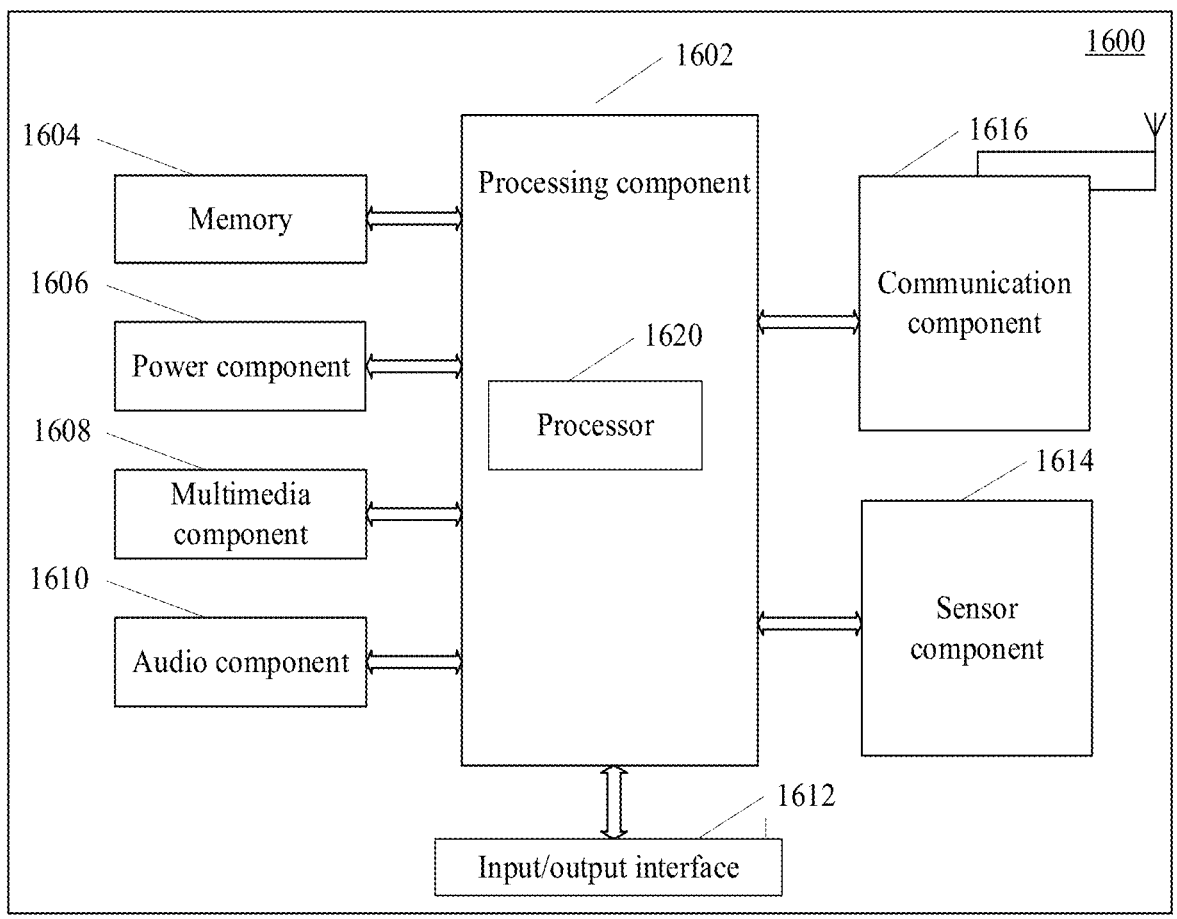
FIG. 16 illustrates a structural block diagram of a second terminal according to an example embodiment.

FIG. 16 illustrates a structural block diagram of a second terminal according to an example embodiment. For example, the second terminal 1600 may be a mobile phone, a computer, a digital broadcast terminal, a messaging device, a game console, a tablet device, a medical device, a fitness device, a personal digital assistant, or the like.

Referring to FIG. 16, the second terminal 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 generally controls overall operations such as operations associated with display, telephone call, data communication, camera operation, and recording operation of the second terminal 1600. The processing component 1602 may include one or more processors 1620 to execute instructions to complete all or part of the steps of the method. In addition, the processing component 1602 may include one or more modules to facilitate the interaction between the processing component 1602 and other components. For example, the processing component 1602 may include a multimedia module to facilitate the interaction between the multimedia component 1608 and the processing component 1602.

The memory 1604 is configured to store various types of data to support operations in the second terminal 1600. Examples of these data includes instructions for any application or method operating on the second terminal 1600, contact data, phone book data, messages, pictures, videos, or the like. The memory 1604 may be implemented by any type of volatile or non-volatile storage device or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 1606 supplies electric power for the respective components of the second terminal 1600. The power component 1606 may include a power management system, one or more power supplies, and other components associated with power generation, management, and distribution for the second terminal 1600.

The multimedia component 1608 includes a screen that provides an output interface between the second terminal 1600 and the user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touches, swipes, and gestures on the touch panel. The touch sensor may not only sense a boundary of a touch or swipe action, but also detect duration and pressure associated with the touch or swipe operation. In some embodiments, the multimedia component 1608 includes a front camera or a rear camera or both. When the second terminal 1600 is in an operation mode, such as a shooting mode or a video mode, the front camera or the rear camera or both may receive external multimedia data. Each front camera and rear camera may be a fixed optical lens system or have focal length and optical zoom capabilities.

The audio component 1610 is configured to output or input, or both output and input an audio signal. For example, the audio component 1610 includes a microphone (MIC), and when the second terminal 1600 is in an operation mode, such as a call mode, a recording mode, and a voice recognition mode, the microphone is configured to receive an external audio signal. The received audio signal may be further stored in the memory 1604 or transmitted via the communication component 1616. In some embodiments, the audio component 1610 further includes a speaker for outputting the audio signal.

The I/O interface 1612 provides an interface between the processing component 1602 and a peripheral interface module, which may be a keyboard, a click or tap wheel, a button, etc. These buttons may include but are not limited to: a home button, a volume button, a start button, and a lock button.

The sensor component 1614 includes one or more sensors for providing the second terminal 1600 with status evaluations in all aspects. For example, the sensor component 1614 may detect an On/Off state of the second terminal 1600 and relative positioning of the components which for example include a display and a keypad of the second terminal 1600; and the sensor component 1614 may also detect a change in position of the second terminal 1600 or a component of the second terminal 1600, presence of contact between the user and the second terminal 1600, an orientation or acceleration/deceleration of the second terminal 1600, and a temperature change of the second terminal 1600. The sensor component 1614 may include a proximity sensor configured to detect the presence of a nearby object when there is no physical contact. The sensor component 1614 may further include an optical sensor, such as a CMOS or CCD image sensor, for use in an imaging application. In some embodiments, the sensor component 1614 may further include an acceleration sensor, a gyroscope sensor, a magnetic sensor, a pressure sensor, or a temperature sensor.

The communication component 1616 is configured to facilitate wired or wireless communication between the second terminal 1600 and other devices. The second terminal 1600 may access a communication standard based wireless network, such as Wi-Fi, an operator network (such as 2G, 3G, 4G, or 5G), or a combination thereof. In an example embodiment, the communication component 1616 receives a broadcast signal or broadcast related information from an external broadcast management system via a broadcast channel. In an example embodiment, the communication component 1616 further includes a near field communication (NFC) module for facilitating short-range communication. For example, the NFC module may be implemented based on radio frequency identification (RFID) technologies, infrared data association (IrDA) technologies, ultra-wideband (UWB) technologies, Bluetooth (BT) technologies, and other technologies.

In an example embodiment, the second terminal 1600 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, and configured to perform any of the methods for processing data applicable to the second terminal.

In some embodiments, the second terminal 1600 is an electronic device. The electronic device includes: a processor, and a memory for storing at least one instruction executable by the processor.

The at least one instruction, when executed by the processor, enables the processor to perform the following operations:

displaying a live streaming image based on live streaming data, wherein the live streaming image includes a first virtual avatar;

receiving first pose data of the first virtual avatar, wherein the first pose data is triggered by an interactive message; and displaying the first virtual avatar in the live streaming image based on the first pose data.

In some embodiments, the at least one instruction, when executed by the processor, enables the processor to perform the following operation:

displaying a first action segment of the first virtual avatar based on the live streaming image, wherein the first action segment is triggered by a first voice command.

In some embodiments, the at least one instruction, when executed by the processor, enables the processor to perform the following operation:

displaying a second action segment of the first virtual avatar is displayed based on the live streaming image, wherein the second action segment is intended to indicate that the first virtual avatar interacts with a second virtual avatar.

In an example embodiment, a non-transitory computer-readable storage medium including at least one instruction, such as a memory 1604 including at least one instruction, is also provided. The at least one instruction, when executed by the processor 1620 of the second terminal 1600, enables the processor 1620 to perform the method for processing data as described above. For example, the non-transitory computer-readable storage medium may be a ROM, a random access memory (RAM), a CD-ROM, a magnetic tape, a floppy disk, an optical data storage device, and the like.

In some embodiments, when the at least one instruction, when executed by a processor of an electronic device (for example, the second terminal 1600), enables the processor to perform the following operations:

displaying a live streaming image based on live streaming data, wherein the live streaming image includes a first virtual avatar;

receiving first pose data of the first virtual avatar, wherein the first pose data is triggered by an interactive message; and displaying the first virtual avatar in the live streaming image based on the first pose data.

In some embodiments, the at least one instruction, when executed by the processor, enables the processor to perform the following operation:

displaying a first action segment of the first virtual avatar based on the live streaming image, wherein the first action segment is triggered by a first voice command.

In some embodiments, the at least one instruction, when executed by the processor, enables the processor to perform the following operation:

displaying a second action segment of the first virtual avatar based on the live streaming image, wherein the second action segment is intended to indicate that the first virtual avatar interacts with a second virtual avatar.

With the second terminal according to the embodiments of the present disclosure, when the anchor is chatting with the audience, the real-time chat data can be acquired from the first terminal, the first feature data can be extracted from the real-time chat data, and then, the first pose data corresponding to the first feature data can be determined based on the pre-established corresponding relationship between the feature data and the pose data of the first virtual avatar; and finally, the pose of the first virtual avatar can be changed based on the first pose data, and the first virtual avatar with the pose changed based on the first pose data can be transmitted to the first terminal. As a result, the virtual avatar can also interact with the audience, and an interactive mode other than the interactive mode of the anchor interacting with the audience can thus be provided. Therefore, the anchor can be prevented from failing to interact with the audience in time, thereby avoiding the dissatisfaction of the audience.

In an example embodiment, a storage medium including instructions, such as the memory 1604 including instructions, is also provided; and the instructions above may be executed by the processor 1620 of the second terminal 1600 to perform the methods for processing data. Optionally, the storage medium may be a non-transitory computer-readable storage medium. For example, the non-transitory computer-readable storage medium may be a ROM, a random-access memory (RAM), a CD-ROM, a magnetic tape, a floppy disk, an optical data storage device, and the like.

Figure 17:
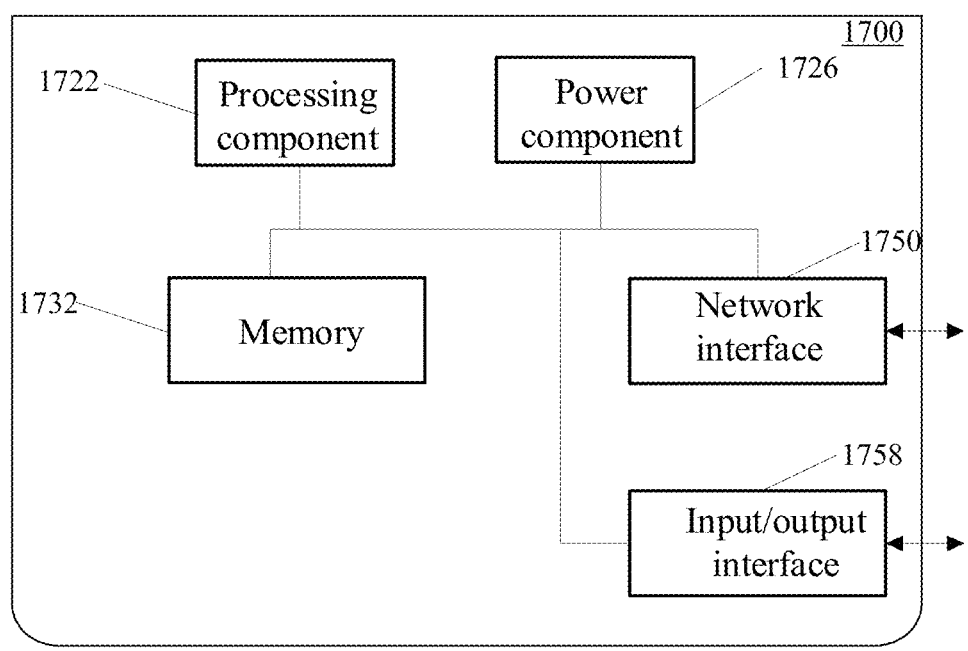
FIG. 17 illustrates a structural block diagram of a server according to an example embodiment.

FIG. 17 illustrates a structural block diagram of a server according to an example embodiment. Referring to FIG. 17, the server 1700 includes: a processing component 1722, which further includes one or more processors; and a memory resource represented by a memory 1732 for storing instructions (for example, an application program) executable by the processing component 1722. The application program stored in the memory 1732 may include one or more modules, each of which corresponds to a set of instructions. In addition, the processing component 1722 is configured to execute the instructions to perform any of the method for processing data on the server.

The server 1700 may further include: a power component 1726 configured to manage the power of the server 1700, a wired or wireless network interface 1750 configured to connect the server 1700 to a network, and an input/output (I/O) interface 1758. The server 1700 may operate an operating system, such as Windows Server™, Mac OS X™, Unix™, Linux™, FreeBSD™ or the like, stored in the memory 1732.

In some embodiments, the server 1700 is also an electronic device, which includes: a processor, and a memory for storing at least one instruction executable by the processor.

The at least one instruction, when executed by the processor, enables the processor to perform the following operations:

acquiring an interactive message, the interactive message being transmitted based on live streaming data;
extracting first feature data from the interactive message;
determining first pose data based on the first feature data; and
determining a pose of a first virtual avatar based on the first pose data, and transmitting the first virtual avatar.

In some embodiments, the first virtual avatar is determined based on a human body model and second feature data, wherein the second feature data includes feature data based on first human body posture information of a target user.

In some embodiments, the second feature data includes a face feature and a human body feature of the target user.

In some embodiments, the human body model is determined based on model limbs. The model limbs are searched from a human body model limb library based on a voice feature, wherein the voice feature is intended to indicate an acoustic feature of a limb selection voice command input by the target user.

In some embodiments, the at least one instruction, when executed by the processor, enables the processor to perform the following operation:

acquiring avatar change operation information, and changing the first virtual avatar based on the avatar change operation information.

In some embodiments, the first virtual avatar has dimension parameters changing over time.

In some embodiments, the first virtual avatar is generated based on history data, wherein the history data at least includes at least one of history virtual avatar data or history interactive messages.

In some embodiments, the interactive message includes a gift message of a virtual item, and the at least one instruction, when executed by the processor, enables the processor to perform the following operation:

determining the first pose data based on the virtual item in response to the interactive message being the gift message of the virtual item.

In some embodiments, the at least one instruction, when executed by the processor, enables the processor to perform the following operations:

recognizing second human body posture information of the target user based on the live streaming data;
determining, based on the second human body posture information, first action data corresponding to the second human body posture information; and
changing the pose of the first virtual avatar based on the first action data.

In some embodiments, the at least one instruction, when executed by the processor, enables the processor to perform the following operations:

acquiring a first voice command from the live streaming data;
determining first action segment data based on the first voice command, wherein the first action segment data corresponds to the first voice command;
generating a first action segment based on the first action segment data; and
changing the pose of the first virtual avatar based on the first action segment.

In some embodiments, the at least one instruction, when executed by the processor, enables the processor to perform the following operations:

receiving a second voice command from the live streaming data;
determining a target account based on the second voice command;
acquiring second action segment data, wherein the second action segment data corresponds to the first virtual avatar and a second virtual avatar, the second virtual avatar corresponding to the target account;
generating a second action segment based on the second action segment data, wherein the second action segment is intended to indicate that the first virtual avatar interacts with the second virtual avatar; and
changing the pose of the first virtual avatar based on the second action segment.

In an example embodiment, a storage medium including at least one instruction, for example, the memory 1732 including at least one instruction, is further provided. The at least one instruction, when executed by the processing component 1722 of the server 1700, enables the processing component 1722 to perform the method for processing data as described above. Optionally, the storage medium may be a non-transitory computer-readable storage medium. For example, the non-transitory computer-readable storage medium may be a ROM, a random-access memory (RAM), a CD-ROM, a magnetic tape, a floppy disk, an optical data storage device, and the like.

In some embodiments, the at least one instruction, when executed by a processor of an electronic device (for example, the server 1700), enables the processor to perform the following operations:

acquiring an interactive message, the interactive message being transmitted based on live streaming data;

extracting first feature data from the interactive message;

determining first pose data based on the first feature data; and determining a pose of a first virtual avatar based on the first pose data, and transmitting the first virtual avatar.

In some embodiments, the first virtual avatar is determined based on a human body model and second feature data, wherein the second feature data includes feature data based on first human body posture information of a target user.

In some embodiments, the second feature data includes a face feature and a human body feature of the target user.

In some embodiments, the human body model is determined based on model limbs. The model limbs are searched from a human body model limb library based on a voice feature, wherein the voice feature is intended to indicate an acoustic feature of a limb selection voice command input by the target user.

In some embodiments, the at least one instruction, when executed by the processor, enables the processor to perform the following operation:

acquiring avatar change operation information, and changing the first virtual avatar based on the avatar change operation information.

In some embodiments, the first virtual avatar has dimension parameters changing over time.

In some embodiments, the first virtual avatar is generated based on history data, wherein the history data at least includes at least one of history virtual avatar data or history interactive messages.

In some embodiments, the interactive message includes a gift message of a virtual item, and the at least one instruction, when executed by the processor, enables the processor to perform the following operation:

Determining the first pose data based on the virtual item in response to the interactive message being the gift message of the virtual item.

In some embodiments, the at least one instruction, when executed by the processor, enables the processor to perform the following operations:

recognizing second human body posture information of the target user based on the live streaming data;

determining, based on the second human body posture information, first action data corresponding to the second human body posture information; and changing the pose of the first virtual avatar based on the first action data.

In some embodiments, the at least one instruction, when executed by the processor, enables the processor to perform the following operations:

acquiring a first voice command from the live streaming data;

determining first action segment data based on the first voice command, wherein the first action segment data corresponds to the first voice command;

generating a first action segment based on the first action segment data; and changing the pose of the first virtual avatar based on the first action segment.

In some embodiments, the at least one instruction, when executed by the processor, enables the processor to perform the following operations:

receiving a second voice command from the live streaming data;

determining a target account based on the second voice command;

acquiring second action segment data, wherein the second action segment data corresponds to the first virtual avatar and a second virtual avatar, the second virtual avatar corresponding to the target account;

generating a second action segment based on the second action segment data, wherein the second action segment is intended to indicate that the first virtual avatar interacts with the second virtual avatar; and changing the pose of the first virtual avatar based on the second action segment.

With the server according to the embodiments of the present disclosure, when the anchor is chatting with the audience, the real-time chat data transmitted by the first terminal or the second terminal or both can be acquired, the first feature data can be extracted from the real-time chat data, and then, the first pose data corresponding to the first feature data can be determined based on the pre-established corresponding relationship between the feature data and the pose data of the first virtual avatar; and finally, the pose of the first virtual avatar can be changed based on the first pose data, and the first virtual avatar with the pose changed based on the first pose data can be transmitted to the first terminal. As a result, the virtual avatar can also interact with the audience, and an interactive mode other than the interactive mode of the anchor interacting with the audience can thus be provided. Therefore, the anchor can be prevented from failing to interact with the audience in time, thereby avoiding the dissatisfaction of the audience.

An embodiment of the present disclosure further provides a program product including at least one instruction. The program product, when running on a server, enables the server to perform all or part of the steps of the method for processing data on the server.

An embodiment of the present disclosure further provides a program product including at least one instruction. The program product, when running on a second terminal, enables the second terminal to perform all or part of the steps of the method for processing data on the second terminal.

An embodiment of the present disclosure further provides a computer program. The computer program, when running on a server, enables the server to perform all or part of the steps of the method for processing data on the server.

An embodiment of the present disclosure further provides a computer program. The computer program, when running on a second terminal, enables the second terminal to perform all or part of the steps of the method for processing data on the second terminal.

It should be noted that, as used herein, relational terms such as "first" and "second" are only intended to distinguish one entity or operation from another entity or operation, but do not necessarily require or imply any such actual relationship or sequence between these entities or operations. Moreover, the terms "comprise", "include" or any other variants thereof are intended to cover non-exclusive inclusion, such that a process, a method, an article, or a device that includes a series of elements not only includes those elements, but also includes other elements that are not listed explicitly, or also includes elements inherent to this process, method, article, or device. In case of no more limitations, an element defined by a statement "comprises a/an . . . " does not exclude the existence of other same elements in the process, method, article, or device including the element.

The embodiments in the description are described in a related manner, and the same or similar parts among the respective embodiments may be referred to each other, and each embodiment focuses on a difference from other embodiments. In particular, system embodiments are essentially similar to method embodiments, and thus are described in a simple way. Reference may be made to part of the illustration of the method embodiments for points involved.

Described above are merely example embodiments of the present disclosure, which are not intended to limit the protection scope the present disclosure. After taking the description and the disclosure in the embodiments into consideration, those skilled in the art may easily think of other embodiments of the present disclosure. The present disclosure is intended to cover any variations, uses, or adaptive changes of the present disclosure. These variations, uses, or adaptive changes follow the general principle of the present disclosure and include common knowledge or conventional technical means in the technical field, which is not disclosed in the present disclosure. The description and the embodiments of the present disclosure are considered to be illustrative only, and the true scope and spirit of the present disclosure are set forth by the following claims.

It should be understood that the present disclosure is not limited to the precise structure that has been described above and illustrated in the drawings, and various modifications and variations may be made without departing from the scope of the present disclosure. The scope of the present disclosure is defined only by the appended claims.

What is claimed is:

1. A method for processing data, comprising:
    acquiring interactive messages that are transmitted from a first terminal and a second terminal, wherein the first terminal is a terminal used by an audience watching live streaming of an anchor in a live streaming room, the second terminal is a terminal used by the anchor, the interactive messages are transmitted based on live streaming data corresponding to the anchor during the live streaming, and the interactive messages include real-time chat data;
    extracting first feature data from the interactive messages;
    determining first pose data based on the first feature data; and
    determining a pose of a first virtual avatar based on the first pose data, and transmitting the first virtual avatar to the first terminal.

2. The method according to claim 1, wherein the first virtual avatar is determined based on a human body model and second feature data, the second feature data comprising feature data based on first human body posture information of a target user.

3. The method according to claim 2, wherein the second feature data comprises a face feature and a human body feature of the target user.

4. The method according to claim 2, wherein the human body model is determined based on model limbs, the model limbs being searched from a human body model limb library based on a voice feature, the voice feature comprising an acoustic feature of a limb selection voice command input by the target user.

5. The method according to claim 1, further comprising:
    acquiring avatar change operation information, and changing the first virtual avatar based on the avatar change operation information.

6. The method according to claim 1, wherein a dimension parameter of the first virtual avatar changes over time.

7. The method according to claim 1, wherein the first virtual avatar is generated based on history data, the history data at least comprising at least one of history virtual avatar data or history interactive messages.

8. The method according to claim 1, wherein the interactive messages comprises a gift message of a virtual item, and said determining the first pose data of the first virtual avatar comprises:
    determining the first pose data based on the virtual item in response to the interactive messages being the gift message of the virtual item.

9. The method according to claim 1, further comprising:
    recognizing second human body posture information of a target user based on the live streaming data;
    determining, based on the second human body posture information, first action data corresponding to the second human body posture information; and
    changing the pose of the first virtual avatar based on the first action data.

10. The method according to claim 1, further comprising:
    acquiring a first voice command from the live streaming data;
    determining first action segment data based on the first voice command, wherein the first action segment data corresponds to the first voice command;
    generating a first action segment based on the first action segment data; and
    changing the pose of the first virtual avatar based on the first action segment.

11. The method according to claim 1, further comprising:
    receiving a second voice command from the live streaming data;
    determining a target account based on the second voice command;
    acquiring second action segment data, wherein the second action segment data corresponds to the first virtual avatar and a second virtual avatar, the second virtual avatar corresponding to the target account;
    generating a second action segment based on the second action segment data, wherein the second action segment is intended to indicate that the first virtual avatar interacts with the second virtual avatar; and
    changing the pose of the first virtual avatar based on the second action segment.

12. A method for processing data, comprising:
    displaying a live streaming image based on live streaming data corresponding to an anchor using a second terminal during live streaming in a live streaming room, wherein the live streaming image comprises a first virtual avatar;
    receiving first pose data of the first virtual avatar, wherein the first pose data is triggered by interactive messages that are transmitted from a first terminal and the second terminal, the interactive messages including real-time chat data, and the first terminal being a terminal used by an audience watching the live streaming of the anchor in the live streaming room; and
    displaying the first virtual avatar in the live streaming image based on the first pose data.

13. The method according to claim 12, further comprising:
    displaying a first action segment of the first virtual avatar based on the live streaming image, wherein the first action segment is triggered by a first voice command.

14. The method according to claim 12, further comprising:
   displaying a second action segment of the first virtual avatar based on the live streaming image, wherein the second action segment is intended to indicate that the first virtual avatar interacts with a second virtual avatar.

15. An electronic device, comprising: a processor, and a memory for storing at least one instruction executable by the processor;
   wherein the at least one instruction, when executed by the processor, causes the processor to perform a method comprising:
   acquiring an interactive messages that are transmitted from a first terminal and a second terminal, wherein the first terminal is a terminal used by an audience watching live streaming of an anchor in a live streaming room, the second terminal is a terminal used by the anchor, the interactive messages are transmitted based on live streaming data corresponding to the anchor during the live streaming, and the interactive messages include real-time chat data;
   extracting first feature data from the interactive messages;
   determining first pose data based on the first feature data, wherein the first pose data corresponds to the first feature data; and
   determining a pose of a first virtual avatar based on the first pose data, and transmitting the first virtual avatar.

16. The electronic device according to claim 15, wherein the first virtual avatar is determined based on a human body model and second feature data, the second feature data comprising feature data based on first human body posture information of a target user.

17. The electronic device according to claim 16, wherein the second feature data comprises a face feature and a human body feature of the target user.

18. The electronic device according to claim 15, wherein the method further comprises:
   recognizing second human body posture information of a target user based on the live streaming data;
   determining, based on the second human body posture information, first action data corresponding to the second human body posture information; and
   changing the pose of the first virtual avatar based on the first action data.

19. The electronic device according to claim 15, wherein the method further comprises:
   acquiring a first voice command from the live streaming data;
   determining first action segment data based on the first voice command, wherein the first action segment data corresponds to the first voice command;
   generating a first action segment based on the first action segment data; and
   changing the pose of the first virtual avatar based on the first action segment.

20. The electronic device according to claim 15, wherein the method further comprises:
   receiving a second voice command from the live streaming data;
   determining a target account based on the second voice command;
   acquiring second action segment data, wherein the second action segment data corresponds to the first virtual avatar and a second virtual avatar, the second virtual avatar corresponding to the target account;
   generating a second action segment based on the second action segment data, wherein the second action segment is intended to indicate that the first virtual avatar interacts with the second virtual avatar; and
   changing the pose of the first virtual avatar based on the second action segment.

* * * * *